(12) United States Patent
Mizukoshi

(10) Patent No.: US 8,320,295 B2
(45) Date of Patent: Nov. 27, 2012

(54) MOBILE IP CONTROL SYSTEM, MOBILE IP CONTROL METHOD, AND MOBILE IP CONTROL PROGRAM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 12/523,572

(22) PCT Filed: Jan. 16, 2008

(86) PCT No.: PCT/JP2008/050452
§ 371 (c)(1),
(2), (4) Date: Jul. 17, 2009

(87) PCT Pub. No.: WO2008/087988
PCT Pub. Date: Jul. 24, 2008

(65) Prior Publication Data
US 2010/0046416 A1    Feb. 25, 2010

(30) Foreign Application Priority Data
Jan. 18, 2007    (JP) .................................. 2007-009216

(51) Int. Cl.
*H04B 7/14* (2006.01)
*H04W 4/00* (2009.01)
(52) U.S. Cl. ...................................... 370/315; 455/435.2
(58) Field of Classification Search .................. None
See application file for complete search history.

(56) References Cited

U.S. PATENT DOCUMENTS

| | | | | |
|---|---|---|---|---|
| 2007/0076732 A1* | 4/2007 | Kim | ............................ | 370/409 |
| 2007/0160007 A1* | 7/2007 | Wang et al. | .................. | 370/331 |
| 2007/0197221 A1* | 8/2007 | Ryu et al. | .................. | 455/435.2 |
| 2007/0211723 A1* | 9/2007 | Patel et al. | ..................... | 370/392 |
| 2007/0225032 A1 | 9/2007 | Saito | | |
| 2008/0104231 A1* | 5/2008 | Dey et al. | ...................... | 709/224 |
| 2009/0191878 A1* | 7/2009 | Hedqvist et al. | .............. | 455/441 |

FOREIGN PATENT DOCUMENTS

| | | | |
|---|---|---|---|
| JP | 2002290445 A | 10/2002 |
| JP | 2005136615 A | 5/2005 |
| JP | 2005244525 A | 9/2005 |

(Continued)

OTHER PUBLICATIONS

International Search Report for PCT/JP2008/050452 mailed May 1, 2008.

(Continued)

*Primary Examiner* — John Blanton

(57) ABSTRACT

To suppress communication delay and data loss caused by the radio type of a mobile terminal and the radio communication band when a communication packet is sent to the mobile terminal in a mobile IP system. A mobile IP control system includes: a radio base station (40A) which provides a radio connection link to a mobile terminal (50); a home agent (20) which transfers a communication packet transmitted from a partner terminal (60), to the mobile terminal (50); and a foreign agent (30A) which relays mutual communication between the foreign agent (30A) and the radio base station (40A). The foreign agent (30A) notifies the home agent (20) of the communication band of the radio communication performed between the radio base station (40A) and the mobile terminal (50). The home agent (20) performs band control for packet transmission to the mobile terminal (50) in accordance with the notified communication band.

19 Claims, 20 Drawing Sheets

FOREIGN PATENT DOCUMENTS

| | | |
|---|---|---|
| JP | 2005340982 A | 12/2005 |
| JP | 2006094388 A | 4/2006 |
| JP | 2006211721 A | 8/2006 |
| JP | 2006245824 A | 9/2006 |
| JP | 2007036432 A | 2/2007 |
| JP | 2007281623 A | 10/2007 |

OTHER PUBLICATIONS

Japanese Office Action for JP2008-554065 issued Apr. 17, 2012.

Japanese Office Action for JP2008-554065 mailed on Jul. 10, 2012.

* cited by examiner

FIG. 3

| ID FOR IDENTIFYING MOBILE TERMINAL | HOME ADDRESS OF MOBILE TERMINAL | CARE-OF ADDRESS | UPSTREAM CAPACITY | DOWNSTREAM CAPACITY | TRANSMISSION RATE(1) | TRANSMISSION RATE(2) |
|---|---|---|---|---|---|---|
| MN1 | 192.168.11.103 | CoA1 | 64Mbps | 384Mbps | 128Mbps | 54Mbps |
| MN2 | 192.168.11.107 | CoA2 | 5Mbps | 5Mbps | 2Mbps | 1Mbps |
| MN3 | 162.3.5.28 | CoA3 | 20Mbps | 122Mbps | 68Mbps | 14Mbps |

FIG. 5A

| ID FOR IDENTIFYING MOBILE TERMINAL | BEARER TYPE | UPSTREAM CAPACITY | DOWNSTREAM CAPACITY |
|---|---|---|---|
| MN1 | 1 | 64Mbps | 384Mbps |
| MN2 | 4 | 5Mbps | 20Mbps |

FIG. 5B

| TYPE | LENGTH | BEARER TYPE | UPSTREAM CAPACITY | DOWNSTREAM CAPACITY |
|---|---|---|---|---|
| 9 | 12 | 1 | 64Mbps | 384Mbps |

US 8,320,295 B2

MOBILE IP CONTROL SYSTEM, MOBILE IP CONTROL METHOD, AND MOBILE IP CONTROL PROGRAM

This application is the National Phase of PCT/JP2008/050452, filed Jan. 16, 2008, which is based upon and claims priority to Japanese Patent Application No. 2007-009216, filed on Jan. 18, 2007, the contents of which are incorporated herein by reference in its entirety.

TECHNICAL FIELD

The present invention relates to a mobile IP control system, a mobile IP control method, and a mobile IP control program for controlling a communication quality in the communication performed between a mobile terminal and a partner terminal over a communication network.

BACKGROUND ART

As a method of switching wireless network media from one to another smoothly between different wireless network media such as a mobile phone network, a WiMAX network, or the like, while maintaining a communication session between a mobile terminal and the wireless network media, a method using a mobile IP system has been considered.

In the mobile IP system, for the communication performed between a mobile terminal and a partner terminal, a home agent which manages an address of the mobile terminal being at a visited location forwards a communication data transmitted from the partner terminal to a mobile terminal at the visited location. With this, it becomes possible to search out an optimal network for communication at a specific time and a specific location for the mobile terminal and switch a connecting destination in a flexible manner.

For example, a user of a mobile terminal which corresponds to the above described mobile IP system can use a communication service by switching carriers and different types of networks (wireless network media) seamlessly in such a manner as being connected to a wireless LAN when the user is in an office; being automatically connected to a broadband connecting service such as the WiMAX network and the mobile phone network when the user is out of the office; and being automatically connected to a relatively slow mobile phone connecting service when the user is out of town.

A traditional mobile IP control system includes: a mobile terminal 50 which is connectable to different wireless network media; a home network 512 which is set in advance to be a network to which the mobile terminal 50 belongs; a home agent 520 which configures a part of the home network 512 and, at the same time, is connected to an IP network 11 being a public network; and a mobile phone network 513, a wireless LAN network 514, a WiMAX network 515, and a VPN network 516 which are connected to the IP network 11 respectively. The traditional mobile IP control system is configured such that a partner terminal 60 which executes a mutual communication with the mobile terminal 50 via the home agent 520 is connected to the IP network 11.

There, the mobile phone network 513 includes a radio base station 540A which presents a radio link to the mobile terminal 50 and a foreign agent 530A which relays a mutual communication performed between the radio base station 540A and the home agent 520, where the mobile phone network 513 is connected to the IP network 11 via the foreign agent 530A.

Also, the wireless LAN network 514 includes an access router 540B which presents a radio link to the mobile terminal 50 and a foreign agent 530A which relays a mutual communication performed between the access router 540B and the home agent 520, where the wireless LAN network 514 is connected to the IP network 11 via the foreign agent 530A.

Further, the WiMAX network 515 includes a radio base station 540C which presents a radio link to the mobile terminal 50 and a foreign agent 530C which relays a mutual communication performed between the radio base station 540C and the home agent 520, where the WiMAX network 515 is connected to the IP network 11 via the foreign agent 530C.

Also, the VPN network 516 includes a radio base station 540D which presents a radio link to the mobile terminal 50 and a foreign agent 530D which relays a mutual communication performed between the radio base station 540D and the home agent 520, where the VPN network 516 is connected to the IP network 11 via the foreign agent 530D.

Here, a method used in the traditional mobile IP control system for the communication from the partner terminal to the mobile terminal will be described.

First, a network (home network) to which the mobile terminal 50 belongs and a unique address (home address) which is not changed by movement of the mobile terminal 50 are set in advance for the mobile terminal 50.

The mobile terminal 50 acquires a foreign address (hereinafter referred to as "care-of address") corresponding to an address system of each network, by establishing a radio connection with a network other than the home network, i.e., the mobile phone network 513, the wireless LAN network 514, the WiMAX network 515, or the VPN network 516 here.

The mobile terminal 50 notifies the home agent 520 of an acquired care-of address. The home agent 520 registers the care-of address so as to be associated with the home address of the mobile terminal 50.

Meanwhile, in the mobile IP control system, all the packets transmitted from the partner terminal 60 to the mobile terminal 50 are sent into the home agent 520. There, the home agent 520 adds the notified care-of address to the packets which are sent to the home address of the mobile terminal 50, and forwards the packets to the mobile terminal 50. The forwarded packets are received by the foreign agent, and the added care-of address is removed. Then, the packets are forwarded to the mobile terminal 50.

In each network medium of the mobile phone network 513, the wireless LAN network 514, the WiMAX network 515, and the VPN network 516, radio communication is performed with the mobile terminal 50 with which a radio connection is established, by using each different communication band.

Therefore, when the mobile terminal 50 performs a handover between the above described different network media, a delay or a data loss can be generated to the packet sent to the mobile terminal 50. This is attributed to the fact that the radio communication band used for the radio connection is different between a network media from which the connection is switched and another network media to which the connection is switched.

Also, as data transmitted/received via the IP network, the communication data which requires a relatively large communication capacity, such as audio data for an IP phone and the video and music data distributed by streaming, has become more common recently. Since the communication transmitting and receiving the above described communication data is performed in a real-time manner, a communication delay and a data loss result in interruption of the audio and distortion of the video image. Therefore, the communication delay and the data loss described above become major factors in disturbing the communication system itself.

Consequently, the necessity to control a communication quality (QoS: Quality of Service) by managing the radio communication band used in the mobile IP control system, for effectively using the radio communication band, is arisen.

For example, a method of providing an information control service corresponding to the care-of address at a visited location of the mobile terminal is disclosed (see Patent Document 1).

However, the radio communication system has been diversified recently, so the home agent cannot comprehend the information about a communication band capacity or a radio type being used by the mobile terminal with the method based on the care-of address of the mobile terminal.

Further, the QoS cannot be controlled so as to correspond to a band capacity which changes when the mobile terminal changes a destination of the radio connection (when handover is performed).

Thus, a mobile IP control system which can realize a seamless handover between different radio types of networks and control the QoS corresponding to the communication band used by the mobile terminal for the radio connection and the change therein has been demanded.

Patent Document 1: Japanese Patent Application Laid-Open No. 2005-340982

DISCLOSURE OF THE INVENTION

Problems to be Solved by the Invention

A first problem is, as described above, when the communication band used for the radio communication mutually performed between the radio base station (or an access router) and the mobile terminal is changed as such a case where the mobile terminal according to the traditional technique performs the handover between the radio network media which are different in communication band capacity, the delay and the data loss can be generated in the packet transmission performed from the home agent to the mobile terminal. This is because the transmission rate of the packet transmitted from the home agent to the mobile terminal cannot be controlled so as to correspond to the communication band used by the mobile terminal.

A second problem is, when the above described band control is performed by the home agent, there is no way for the home agent to exactly comprehend the information about the communication band capacity and the radio type of the radio communication (Bearer information) used by the mobile terminal.

In this case, if the mobile terminal itself notifies the home agent of the Bearer information in use, the communication band to be used by the mobile terminal is consumed with this, and there is such a disadvantage that an available radio band capacity is decreased.

Object of the Invention

It is an exemplary object of the invention to provide a mobile IP control system that can improve the above described disadvantage of the traditional embodiment, and in particular, suppress the communication delay and the data loss generated according to a change or a shortage in the communication band capacity used for the radio communication in the mobile IP communication.

Means for Solving the Problems

In order to achieve the foregoing exemplary object, a mobile IP control system according to the invention is a system including one or a plurality of radio relay devices for presenting a radio connection link to a mobile terminal and a home agent for communicating with the mobile terminal via each of the radio relay devices, where the mobile terminal and a partner terminal set in advance communicate mutually via the home agent, and the home agent controls a transmission rate of the communication performed from the home agent to the mobile terminal based on the communication band used for the mutual radio communication between each of the radio relay devices and the mobile terminal.

Further, the mobile IP control system includes, in addition to the radio relay device, a foreign agent which relays the mutual communication between the home agent and each of the radio relay devices, and the foreign agent has a communication band notifying function for detecting a communication band of the mutual radio communication performed between the radio relay device and the mobile terminal and notifying the home agent of the detected communication band.

With this, the mutual radio communication band which is used between the mobile terminal and the radio relay device is notified appropriately to the home agent by the foreign agent. Therefore, the communication delay and the data loss generated according to a change or a shortage in the radio communication band capacity can be suppressed, and further, the network in the entire mobile IP system can be used efficiently.

Also, a mobile IP control method according to the present invention is a method of controlling a mobile IP with which a mobile terminal and a partner terminal communicates via a home agent which manages a foreign address of the mobile terminal, and the method includes: a radio connection establishment step in which the mobile terminal establishes a radio connection at a visited location and a foreign address is assigned to the mobile terminal; a communication band detection step of detecting a value of the communication band of the established radio connection; a foreign address notification step of notifying the home agent of the detected value of the communication band and the foreign address; and a transmission rate control step of controlling a packet transmission rate based on the notified value of the communication band when the home agent forwards a packet received from the partner terminal to the notified foreign address.

Further, the mobile IP control method may include a communication band notification step of, when the value of the communication band of the established radio communication is changed, notifying the home agent of a newly detected value of the communication band, prior to the transmission rate control step.

With this, the radio communication band used for the radio communication of the mobile terminal and a change therein are notified to the home agent appropriately, and the home agent can perform the packet transmission to the mobile terminal at an optimal communication rate (communication speed) based on the notified value of the radio communication band.

Also, a mobile IP control program according to the invention is a program for controlling a mutual communication performed between a mobile terminal and a partner terminal via a home agent which manages a foreign address of the mobile terminal, and the program causes a computer to execute: an address and band corresponding/storing function for storing a communication band of the radio communication performed by the mobile terminal at a visited location, the foreign address, and a unique address assigned to the mobile terminal in advance, in such a manner as corresponding with each other; and a transmission rate control function for controlling a packet transmission rate when forwarding the packet which is received from the partner terminal to the mobile terminal based on the stored communication band.

With this, the home agent can perform the packet transmission to the mobile terminal at an optimal communication rate (communication speed) corresponding to the radio communication band used for the radio communication of the mobile terminal and a change therein.

Further, a mobile IP control program is a program with which a home agent that relays a mutual communication between a mobile terminal and a partner terminal performs a band control in the mutual communication, the program causes a computer to execute: a communication band detecting function for detecting a communication band of a mutual radio communication between a radio relay device which presents a radio link to the mobile terminal and the mobile terminal; a communication band notifying function for notifying the home agent of the detected communication band; and a communication band update notifying function for notifying the home agent of a newly detected communication band when the communication band of the mutual radio communication between the radio relay device and the mobile terminal is changed.

With this, the radio communication band used for the radio communication of the mobile terminal and a change therein can be notified to the home agent appropriately. Therefore, the home agent can perform the packet transmission to the mobile terminal at an optimal communication rate (communication speed).

Effect of the Invention

According to the present invention, since the foreign agent which relays the communication between the mobile terminal and the home agent is equipped with a function for notifying the home agent of information about the radio communication band and the radio communication type (Bearer information) used by the mobile terminal, the home agent can perform the packet transmission to the mobile terminal at an optimal communication rate corresponding to the radio communication band used by the mobile terminal and a change therein. With this, it becomes possible to present a mobile IP control system which can suppress the communication delay and the data loss which have been generated according to a change or a shortage in radio communication band capacity, and further, can notify the home agent of the radio communication band without consuming the radio band used by the mobile terminal when the radio communication band is changed.

BEST MODE FOR CARRYING OUT THE INVENTION

An exemplary embodiment of the invention is explained hereinafter in detail by referring to attached drawings.

First Exemplary Embodiment

Next, a mobile IP control system according to a first exemplary embodiment of the invention will be explained.

The first exemplary embodiment of the mobile IP control system includes a home agent 20 which manages in-network positional information of a mobile terminal 50 provided in advance, a home network 12 to which the home agent 20 belongs, and an IP network 11 as a universal communication network to which the home agent 20 connects via a communication line, as shown in FIG. 1.

Also, the first exemplary embodiment includes: a mobile phone core network 130 which is connected to the IP network 11 via a communication line; a foreign agent 30A which is connected to the mobile phone core network 130 and relays the mutual communication between the home agent 20 and the mobile terminal 50; and a radio base station 40A which is connected to the foreign agent 30A and presents a radio connection link to the mobile terminal 50, where the mobile terminal 50 is located in an area from which a radio connection to the radio base station 40A is possible.

Further, a partner terminal 60 which performs an IP packet communication with the mobile terminal 50 via the home agent 20 is being connected to the IP network 11.

Here, the foreign agent 30A and the radio base station 40A configure a foreign network 131 by including a terminal and a device which are wirelessly connected to the radio base station 40A. Further, the mobile phone core network 130 and the foreign network 131 which is connected to the mobile phone core network 130 configures a mobile phone network 13.

Note that the mobile phone network 13 may be configured such that a plurality of foreign networks (for example, foreign network 132, 133, . . . ) configured in the same manner as the foreign network 131 are connected to the mobile phone core network 130.

With this, the mobile terminal 50 can perform the communication in the mobile phone network 13 by switching each of the foreign networks (performing handover) as a radio connecting destination.

The home network 12 is a home link of the mobile terminal 50, configured so as to include the home agent 20 which manages the positional information of the mobile terminal 50, as described above. Therefore, the home address which is uniquely assigned in advance to the mobile terminal 50 contains a same prefix as the home network 12. The home agent 20 operates as a proxy for the mobile terminal 50, and forwards a packet which is transmitted to the home address of the mobile terminal 50 from the partner terminal 60 to an address of the mobile terminal 50 in the foreign network 131 (hereinafter referred to as "care-of address").

A typical configuration of the home agent 20 includes: a transmission/reception interface 21 which is connected to the IP network 11 via a communication line; a packet storing device 22 which receives the packet transmitted from the partner terminal 60 via the transmission/reception interface 21 and holds the packet temporary; a binding storing device 23 which stores the positional information of the mobile terminal 50; a packet routing device 24 which forwards the packet based on the stored positional information of the mobile terminal 50; and a band control device 25 which controls the transmission rate of the packet transmitted by the packet routing device 24, as shown in FIG. 2.

Hereinafter, the embodiment will be described in detail.

The above-described transmission/reception interface 21 of the home agent 20 is connected to the IP network 11 and the home network 12, receives the packet transmitted from the partner terminal 60 to the home address of the mobile terminal 50 and sends the packet to the mobile terminal 50.

Note that, when the mobile terminal 50 is connected to the home network 12, the packet transmitted from the partner terminal 60 is forwarded to the mobile terminal 50 via the home network 12.

Also, the transmission/reception interface 21 has a position registration response function for receiving a message notifying of the positional information of the mobile terminal 50 when the mobile terminal 50 connects to a network other than the home network 12 (hereinafter referred to as "position registration request"), and returning a position registration response with respect to the position registration request.

Further, the transmission/reception interface 21 has a communication band registration response function for receiving a communication band registration request that is a message with which the foreign agent 30A notifies of the communication band used by the mobile terminal 50, and returning a communication band registration response with respect to the communication band registration request.

Here, the above-described position registration request contains radio communication type information including a type of the communication and a value of a communication band thereof (upstream band and downstream band) used for the mutual radio communication between the mobile terminal 50 and the radio base station 40A (hereinafter referred to as "Bearer information"), and an ID for identifying the mobile terminal 50 and a care-of address of the mobile terminal 50.

Also, the communication band registration request contains the ID for identifying the mobile terminal 50 and Bearer information of the mutual radio communication performed between the mobile terminal 50 and the radio base station 40A.

The packet storing device 22 has a packet holding function for receiving the packet transmitted from the partner terminal 60 to the home address of the mobile terminal 50, and holding the packet temporary, as described.

The binding storing device 23 has a registration request storing function for receiving and storing the position registration request sent from the mobile terminal 50 via the foreign agent 30A and the communication band registration request sent from the foreign agent 30A.

Also, the binding storing device 23 has a forwarding destination table generating function for generating a forwarding destination table 231 by associating a care-of address contained in the stored position registration request with the home address of the mobile terminal 50, and a forwarding destination table update function for updating a value of the forwarding destination table 231 based on newly received position registration request and communication band registration request.

The forwarding destination table 231 is constructed of an ID for identifying the mobile terminal 50, a home address, a care-of address, the Bearer information, and a packet transmission rate value (initial value is zero) calculated by the band control device 25 described later, as shown in FIG. 3.

The packet routing device 24 has a forwarding destination obtaining function for obtaining a care-of address corresponding to the mobile terminal 50 based on the forwarding destination table 231 of the binding storing device 23, a forwarding destination encapsulating function for performing a process to add an IP header indicating the obtained care-of address to a packet stored in the packet storing device 22 (hereinafter referred to as "encapsulating process"), and a communication path control function for transmitting the encapsulated packet and controlling a forwarding path of the packet based on the care-of address.

Note that the packet routing device 24 may have a forwarding priority determining function for determining a priority of a forwarding order and a transmission rate for the packet according to a type of the packet to be forwarded.

The band control device 25 includes: a transmission rate calculating function for calculating a transmission rate at the time when the packet routing device 24 transmits the packet to the mobile terminal 50, based on the forwarding destination table 231 of the binding storing device 23, and a transmission rate update function for updating the value of the forwarding destination table 231 by using the calculated transmission rate.

Also, the band control device 25 includes a packet transmission control function for controlling the transmission speed of the packet based on the calculated transmission rate value. With this packet transmission control function, the transmission speed of the packet is determined based on the calculated transmission rate value, and a packet transmission flow amount is controlled, by limiting the flow amount temporary for example, on monitoring a frequency and speed at which the communication band packet transmission is performed.

With this, it becomes possible to suppress the transmission of a large amount of the packets to the radio base station and the radio relay devices such as the access router, which exceeds the radio relaying ability thereof, and also, suppress the shortage in transmission band for the radio relay device as well as the generation of an overflow.

The foreign agent 30A described above includes: a foreign communication interface 31A which connects to the radio base station 40A to perform the data transmission/reception; a care-of address assigning device 32A which transmits and assigns the foreign address to the mobile terminal 50 via the foreign communication interface 31A; a communication band detecting device 33A which detects the communication band of the radio communication performed between the mobile terminal 50 to which the care-of address is assigned and the radio base station 40A; a registration request storing device 34A which holds a position registration request sent from the mobile terminal 50 temporary and adds the detected communication band to the position registration request; and a packet forwarding device 35A which transmits the position registration request to which the communication band is added to a home agent 20 and forwards the packet sent from the home agent 20 to the mobile terminal 50, as shown in FIG. 4.

The foreign communication interface 31A performs a communication with the mobile terminal 50 via the radio base station 40A connected over a communication line.

The foreign communication interface 31A has a PPP communication establishing function for establishing a PPP connection with the mobile terminal 50 via the radio base station 40A when the mobile terminal 50 is wirelessly connected to the radio base station 40A.

The care-of address assigning device 32A has an agent advertisement sending function for sending periodically an agent advertisement message (hereinafter referred to as "agent advertisement"), which notifies of a prefix of a foreign network 15, to the mobile terminal 50 via the radio base station 40A, and a foreign address assigning function for assigning an address of a foreign network 131 (care-of address) to the mobile terminal 50 which establishes a radio connection with the radio base station 40A. This care-of address is an address to be designated as a forwarding destination when the home agent 20 forwards the packet sent from a partner terminal 60 to the mobile terminal 50.

The communication band detecting device 33A has a communication band detecting function for detecting a communication band used for the mutual radio communication between the mobile terminal 50 and the radio base station 40A (see *A in FIG. 4), and a Bearer request transmitting function for transmitting periodically a message requesting a communication band notifying device 42A of the radio base station 40A, described later, to notify of the Bearer information (hereinafter referred to as "Bearer request").

Also, the communication band detecting device 33A includes a communication band storing table 331A which stores the Bearer information of a Bearer response returned from the radio base station 40A responding to the Bearer request, and has a band storing table update function for updating a value of the communication band storing table 331 based on a newly received Bearer response. FIG. 5A shows an example of the communication band storing table 331.

The value of the communication band storing table 331A may be set so as to be deleted at a predetermined time interval. With this, when a care-of address of the corresponding mobile terminal is changed, the packet can be prevented from being forwarded to a previous care-of address.

The registration request forwarding device 34A has: a position registration request holding function for receiving a position registration request sent from the mobile terminal 50 and holding it temporary; a Bearer information adding function for adding Bearer information based on the communication band storing table 331 to the position registration request; and a position registration request forwarding function for transmitting the position registration request to which the Bearer information is added to the home agent 20 via a packet forwarding device 35A described later.

Here, FIG. 5B shows a form of Bearer information added to the position registration request described above. For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34A has a band registration request generating function for generating a communication band registration request including the Bearer information based on the updated communication band storing table 331, and a registration request forwarding function for transmitting the communication band registration request to the home agent 20 via the packet forwarding device 35A described later.

The packet forwarding device 35A has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34A to the home agent 20.

The radio base station 40A includes a radio interface 41A which presents a radio link to the mobile terminal 50 and a communication band notifying device 42A which detects a communication band used for the mutual radio communication between the radio interface 41A and the mobile terminal 50, as shown in FIG. 3.

The communication band notifying device 42A has a communication band detecting function, which is executed in response to a change occurred in the communication band of the mutual radio communication between the radio interface 41A and the mobile terminal 50, for detecting the changed communication band, and a communication band notifying function for notifying the communication band detecting device 33A in the foreign agent 30A of the detected communication band.

Also, the communication band notifying device 42A has a Bearer response generating function for generating a Bearer response which includes Bearer information used for the radio communication with the mobile terminal 50 in response to the Bearer request sent from the communication band detecting device 33A and a Bearer response returning function for transmitting the Bearer response to the communication band detecting device 33A.

Further, the communication band notifying device 42A may be configured so as to always detect the communication band of the mutual radio communication between the radio interface 41A and the mobile terminal 50, that is, may be configured such that the communication band detecting function is always executed.

The mobile terminal 50 has the unique home address which is set in advance in the home network 12 (corresponding to a unique address) and the ID for identifying the mobile terminal, as described.

Also, the mobile terminal 50 has a radio wave intensity determining device which determines the radio wave having the highest intensity among the radio waves received at a visited location, and a radio connection establishing device which establishes a radio connection call with the radio relay device (radio base station 40A, in the exemplary embodiment) from which the radio wave is originated.

Further, the mobile terminal 50 has a connecting destination determining function for determining whether or not the radio connecting destination is the home network based on the agent advertisement sent from the foreign agent 30A, and a position registration request transmitting function for generating a position registration request containing the assigned care-of address and transmitting the position registration request to the home agent 20 when the radio connecting destination is determined not to be the home network 12.

With this, the care-of address assigned to the mobile terminal 50 is notified to the home agent 20, and then the mobile terminal 50 becomes possible to receive the packet sent from the partner terminal 60.

Here, an operation of the home agent 20 when receiving the position registration request sent from the mobile terminal 50 as described above will be explained using a flowchart shown in FIG. 6A.

First, the home agent 20 receives the position registration request sent from the mobile terminal 50 via the foreign agent 30A and stores the position registration request in the binding storing device 23 (step S201). The home agent 20 generates the forwarding destination table 231 based on the stored position registration request (step S202). Then, the band control device 25 calculates a packet transmission rate based on the forwarding destination table 231 (step S203).

The packet routing device 24 generates an IP header whose destination address is the care-of address of the forwarding destination table 231, and performs a process (encapsulation) to add the IP header to the packet stored in the packet storing device 22 (step S204).

The packet routing device 24 transmits the encapsulated packet to the care-of address and controls a transmission amount of the packet based on the calculated packet transmission rate (step S205).

Next, an operation of the home agent 20 when receiving the communication band registration request sent from the foreign agent 30A as described above will be explained using a flowchart shown in FIG. 6B.

First, the home agent 20 receives the communication band registration request sent from the foreign agent 30A and stores the communication band registration request in the binding storing device 23 (step S211). The home agent 20 updates a value of the forwarding destination table 231 set in advance, based on the stored communication band registration request (step S212). Then, the band control device 25 calculates and updates a packet transmission rate based on the updated forwarding destination table 231 (step S213).

The packet routing device 24 generates an IP header whose destination address is the care-of address of the forwarding destination table 231, and performs a process (encapsulation) to add the IP header to the packet sent from the partner terminal 60 (step S214). The packet routing device 24 transmits the encapsulated packet to the care-of address and controls a transmission amount of the packet based on the updated packet transmission rate (step S215).

With this, the packet can be sent at a transmission rate corresponding to the notified communication band used by the mobile terminal 50, and then an overflow of the communication data generated at a radio link whose communication band is limited can be suppressed. Consequently, the data loss and the communication delay can be decreased.

Also, even when some changes occur in the radio communication band used by the mobile terminal 50 due to a state of communication traffic of the network or a radio wave condition, the packet can be transmitted at a transmission rate corresponding to the changed radio communication band.

[Explanation of the Operation of a First Exemplary Embodiment]

Here, an operation of mobile IP control system according to a first exemplary embodiment as described above will be explained using a sequence chart shown in FIG. 7.

First, the mobile terminal 50 establishes a radio connection with the radio base station 40A (step S11). Next, the mobile terminal 50 starts a PPP connection with the foreign agent 30A and obtains a care-of address (CoA1) (step S12). Then, the mobile terminal 50 generates a position registration request containing the care-of address (CoA1) and transmits the position registration request to the home agent 20 (step S13).

Next, the foreign agent 30A receives the position registration request and transmits a Bearer request to the radio base station 40A (step S14). The radio base station 40A returns a Bearer response with respect to the Bearer request (step S15). The foreign agent 30A adds Bearer information of the received Bearer response to the received position registration request and forwards the position registration request to the home agent 20 (step S16).

The home agent 20 receives the position registration request and returns the position registration response to the mobile terminal 50 (step S17). With this, the packet communication between the home agent 20 and the mobile terminal 50 becomes possible.

Here, the home agent 20 receives the packet sent from the partner terminal 60 to the mobile terminal 50 (step S18) and forwards the received packet to the mobile terminal 50 by operating such as shown in FIG. 6A (step S19). The forwarded packet is decapsulated by the foreign agent 30A and forwarded to the mobile terminal 50 (step S20).

Here, the PPP connection with the foreign agent 30A is ended by a relocation of the mobile terminal 50 (step S21). With this, the communication band used by the mobile terminal 50 becomes zero, and the Bearer information changes (step S22). The radio base station 40A which detects the change in the Bearer information notifies the foreign agent 30A of the changed Bearer information (communication band is zero, in this case) (step S23).

The foreign agent 30A generates a communication band registration request and transmits it to the home agent 20 (step S24). The home agent 20 which received the communication band registration request returns a communication band registration response to the foreign agent 30A (step S25).

With this, a value of the communication band in the forwarding destination table 231 of the home agent 20 is set to be zero. Therefore, the packet transmission to the radio base station 40A is stopped.

As described above, in the first exemplary embodiment, the transmission rate of the packet transmitted from the home agent 20 to the mobile terminal 50 can be controlled according to the communication band of the mutual radio communication between the mobile terminal 50 and the radio base station 40A in the mobile phone network 13.

Also, when the communication band of the mutual radio communication is changed, the foreign agent 30A detects the change in the communication band, and the transmission rate of the packet transmitted to the mobile terminal 50 can be controlled in response to the change of the actual communication band flexibly, by notifying the home agent 20 of a newly detected communication band.

Further, since the speed (transmission rate) of the packet which flows on the network can be maintained at a constant level, a load according to the communication processing on the radio base station 40A can be decreased.

Also, even when the mobile terminal 50 in the mobile phone network switches a radio connection destination to another radio base station in a state of maintaining a radio communication session, a handover can be realized smoothly without having the packet loss and the communication delay. Therefore, a satisfactory network environment can be realized even with a limited band in the mobile phone network 13.

Second Exemplary Embodiment

Next, a mobile IP control system according to a second exemplary embodiment of the invention will be explained. Here, the same reference numerals are denoted for the same portions as in the first exemplary embodiment described above.

The second exemplary embodiment of the mobile IP control system includes a home agent 20 which manages in-network positional information of a mobile terminal 50 provided in advance, a home network 12 to which the home agent 20 belongs, and an IP network 11 as a universal communication network to which the home agent 20 connects via a communication line, as shown in FIG. 8.

Also, the second exemplary embodiment includes: a wireless LAN core network 140 which is connected to the IP network 11 via a communication line; a foreign agent 30B which is connected to the wireless LAN core network 140 and relays the mutual communication between the home agent 20 and the mobile terminal 50; and an access router 40B which is connected to the foreign agent 30B and presents a radio connection link to the mobile terminal 50, where the mobile terminal 50 is located in an area from which a radio connection to the access router 40B is possible.

Further, a partner terminal 60 which performs an IP packet communication with the mobile terminal 50 via the home agent 20 is being connected to the IP network 11.

Here, the foreign agent 30B and the access router 40B configure a foreign network 141 by including a terminal and a device which are radio-connected to the access router 40B. Further, the wireless LAN core network 140 and the foreign network 141 which is connected to the wireless LAN core network 140 configures a wireless LAN network 14.

Note that the wireless LAN network 14 may be configured such that a plurality of foreign networks configured in the same manner as the foreign network 141 (for example, foreign network 142, 143, . . . ) are connected to the wireless LAN core network 140.

With this, the mobile terminal 50 can perform a communication (handover) in the wireless LAN network 14 by switching each of the foreign networks as a radio-connecting destination.

The home network 12 is a home link of the mobile terminal 50, configured so as to include the home agent 20 which manages the positional information of the mobile terminal 50, as described above. Therefore, the home address which is uniquely assigned to the mobile terminal 50 contains the same prefix as the home network 12. The home agent 20 operates as a proxy for the mobile terminal 50, and forwards a packet which is transmitted to the home address of the mobile terminal 50 from the partner terminal 60 to an address of the mobile terminal 50 in the foreign network 141 (hereinafter referred to as "care-of address").

A typical configuration of the home agent 20 includes, as in the first exemplary embodiment: a transmission/reception interface 21 which is connected to the IP network 11 via a communication line; a packet storing device 22 which receives the packet transmitted from the partner terminal 60 via the transmission/reception interface 21 and holds the packet temporary; a binding storing device 23 which stores the positional information of the mobile terminal 50; a packet routing device 24 which forwards the packet based on the stored positional information of the mobile terminal 50; and a band control device 25 which controls the transmission rate of the packet transmitted by the packet routing device 24, as shown in FIG. 2.

Hereinafter, the embodiment will be described in detail.

The above-described transmission/reception interface 21 of the home agent 20 is connected to the IP network 11 and the home network 12, receives the packet transmitted from the partner terminal 60 to the home address of the mobile terminal 50 and sends the packet to the mobile terminal 50.

Note that, when the mobile terminal 50 is connected to the home network 12, the transmission/reception interface 21 forwards the packet transmitted from the partner terminal 60 to the mobile terminal 50 of the home network 12.

Also, the transmission/reception interface 21 has a position registration response function for receiving a message notifying the transmission/reception interface 21 of the positional information of the mobile terminal 50 when the mobile terminal 50 connects to a network other than the home network 12 (hereinafter referred to as "position registration request"), and returning a position registration response with respect to the position registration request.

Further, the transmission/reception interface 21 has a communication band registration response function for receiving a communication band registration request that is a message with which the foreign agent 30B notifies the transmission/reception interface 21 of the communication band used by the mobile terminal 50, and returning a communication band registration response with respect to the communication band registration request.

Here, the above-described position registration request contains radio communication type information which includes a type of the communication used for the mutual radio communication between the mobile terminal 50 and the access router 40B and a value of a communication band (upstream band and downstream band) thereof (hereinafter referred to as "Bearer information"), and an ID for identifying the mobile terminal 50 and a care-of address of the mobile terminal 50.

Also, the communication band registration request contains the ID for identifying the mobile terminal 50 and Bearer information of the mutual radio communication performed between the mobile terminal 50 and the access router 40B.

The packet storing device 22 has a packet holding function for receiving the packet transmitted from the partner terminal 60 to the home address of the mobile terminal 50, and holding the packet temporary, as described.

The binding storing device 23 has a registration request storing function for receiving and storing the position registration request sent from the mobile terminal 50 via the foreign agent 30B and the communication band registration request sent from the foreign agent 30B.

Also, the binding storing device 23 has a forwarding destination table generating function for generating a forwarding destination table 231 by associating a care-of address contained in the stored position registration request with the home address of the mobile terminal 50, and a forwarding destination table update function for updating a value of the forwarding destination table 231 based on a newly received position registration request and the communication band registration request.

The forwarding destination table 231 is constructed of an ID for identifying the mobile terminal 50, a home address, a care-of address, the Bearer information, and a packet transmission rate value (initial value is zero) calculated by the band control device 25 described later, as shown in FIG. 3.

The packet routing device 24 has a forwarding destination obtaining function for obtaining a care-of address corresponding to the mobile terminal 50 based on the forwarding destination table 231 of the binding storing device 23, a forwarding destination encapsulating function for performing a process to add an IP header indicating the obtained care-of address to a packet stored in the packet storing device 22 (hereinafter referred to as "encapsulating process"), and a communication path control function for transmitting the encapsulated packet and controlling a forwarding path of the packet based on the care-of address.

Note that the packet routing device 24 may have a forwarding priority determining function for determining a priority of a forwarding order and a transmission rate for the packet according to a type of the packet to be forwarded.

The band control device 25 includes: a transmission rate calculating function for calculating a transmission rate at a time when the packet routing device 24 forwards the packet to the mobile terminal 50, based on the forwarding destination table 231 of the binding storing device 23, and a transmission rate update function for updating the value of the forwarding destination table 231 based on the calculated transmission rate.

Also, the band control device 25 includes a packet transmission control function for controlling the transmission speed of the packet based on the calculated transmission rate value. With the packet transmission control function, the transmission speed of the packet is determined based on the calculated transmission rate value, and a packet transmission flow amount is controlled, by being limited temporary for example, on monitoring a frequency and speed at which the communication band packet transmission is performed.

With this, it becomes possible to suppress the transmission of a large amount of the packets to the radio base station and the radio relay devices such as the access router, which exceeds the radio relaying ability thereof, and also, suppress the shortage in transmission band of the radio relay device as well as the generation of an overflow.

The foreign agent 30B described above includes: a foreign communication interface 31B which connects to the access router 40B and performs the data transmission/reception; a care-of address assigning device 32B which transmits and assigns the foreign address to the mobile terminal 50 via the foreign communication interface 31B; a communication band detecting device 33B which detects the communication band of the radio communication performed between the mobile terminal 50 to which the care-of address is assigned and the access router 40B; a registration request storing device 34B which holds a position registration request sent from the mobile terminal 50 temporary and adds the detected communication band to the position registration request; and a packet forwarding device 35B which transmits the position registration request to which the communication band is added to a home agent 20 and forwards the packet sent from the home agent 20 to the mobile terminal 50, as shown in FIG. 9.

The foreign communication interface 31B performs a communication with the mobile terminal 50 via the access router 40B connected over a communication line.

The foreign communication interface 31B has a communication session establishing function for establishing a communication session with the mobile terminal 50 via the access router 40B when the mobile terminal 50 is wirelessly connected to the access router 40B.

The care-of address assigning device 32B has an agent advertisement sending function for sending periodically an agent advertisement message (hereinafter referred to as "agent advertisement"), which notifies of a prefix of a foreign network 15, to the mobile terminal 50 via the access router 40B, and a foreign address assigning function for assigning an address of a foreign network 141 (care-of address) to the mobile terminal 50 which establishes a radio connection with the access router 40B. This care-of address is an address to be designated as a forwarding destination when the home agent 20 forwards the packet sent from a partner terminal 60 to the mobile terminal 50.

The communication band detecting device 33B has a communication band detecting function for detecting a communication band used for the mutual radio communication between the mobile terminal 50 and the access router 40B (see *B in FIG. 9), and a Bearer request transmitting function for transmitting periodically a message requesting a communication band notifying device 42B of the access router 40B, described later, to notify of the Bearer information (hereinafter referred to as "Bearer request").

Also, the communication band detecting device 33B includes a communication band storing table 331B which stores the Bearer information of a Bearer response notified from the access router 40B responding to the Bearer request, and has a band storing table update function for updating a value of the communication band storing table 331B based on a newly received Bearer response. FIG. 5A shows an example of the communication band storing table 331B.

The value of the communication band storing table 331B may be set so as to be deleted at a predetermined time interval. With this, when a care-of address of the corresponding mobile terminal is changed, the packet can be prevented from being forwarded to a previous care-of address.

The registration request forwarding device 34B has: a position registration request holding function for receiving a position registration request sent from the mobile terminal 50 and holding it temporary; a Bearer information adding function for adding Bearer information based on the communication band storing table 331B to the position registration request; and a position registration request forwarding function for transmitting the position registration request to which the Bearer information is added to the home agent 20 via a packet forwarding device 35B described later.

Here, FIG. 5B shows a form of Bearer information added to the position registration request described above. For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34B has a band registration request generating function for generating a communication band registration request including the Bearer information based on the updated communication band storing table 331, and a registration request forwarding function for transmitting the communication band registration request to the home agent 20 via the packet forwarding device 35B described later.

The packet forwarding device 35B has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34B to the home agent 20.

The access router 40B includes a radio interface 41B which presents a radio link to the mobile terminal 50 and a communication band notifying device 42B which detects a communication band used for the mutual radio communication between the radio interface 41B and the mobile terminal 50, as shown in FIG. 9.

The communication band notifying device 42B has a communication band detecting function, which is executed in response to a change occurred in the communication band of the mutual radio communication between the radio interface 41B and the mobile terminal 50, for detecting the changed communication band, and a communication band notifying function for notifying the communication band detecting device 33B in the foreign agent 30B of the detected communication band Also, the communication band notifying device 42B has a Bearer response generating function for generating a Bearer response which includes Bearer information used for the radio communication with the mobile terminal 50 in response to the Bearer request sent from the communication band detecting device 33B and a Bearer response returning function for transmitting the Bearer response to the communication band detecting device 33B.

Further, the communication band notifying device 42B may be configured so as to always detect the communication band of the mutual radio communication between the radio interface 41B and the mobile terminal 50, that is, may be configured such that the communication band detecting function is always executed.

The mobile terminal 50 has the unique home address which is set in advance in the home network 12 (corresponding to a unique address) and the ID for identifying the mobile terminal, as described.

Also, the mobile terminal 50 has a radio wave intensity determining device which determines the radio wave having the highest intensity among the radio waves received at a visited location, and a radio connection establishing device which establishes a radio connection call with the radio relay device from which the radio wave is originated (access router 40B in the exemplary embodiment).

Further, the mobile terminal 50 has a destination determining function for determining whether or not the radio connecting destination is the home network based on the agent advertisement sent from the foreign agent 30B, and a position registration request transmitting function for generating a position registration request containing the assigned care-of address and transmitting the position registration request to the home agent 20 when the radio connecting destination is determined not to be the home network 12.

With this, the care-of address assigned to the mobile terminal 50 is notified to the home agent 20, and then the mobile terminal 50 becomes possible to receive the packet from the partner terminal 60.

Here, an operation of the home agent 20 when receiving the position registration request sent from the mobile terminal 50 as described above will be explained using a flowchart shown in FIG. 6A.

First, the home agent 20 receives the position registration request sent from the mobile terminal 50 via the foreign agent 30B and stores the position registration request in the binding storing device 23 (step S201). The home agent 20 generates a care-of address table 231 based on the stored position registration request (step S202). Then, the band control device 25 calculates a packet transmission rate based on the care-of address table 231 (step S203).

The packet routing device 24 generates an IP header whose destination address is the care-of address of the care-of address table 231, and performs a process (encapsulation) to add the IP header to the packet stored in the packet storing device 22 (step S204).

The packet routing device 24 transmits the encapsulated packet to the care-of address and controls a packet transmission amount based on the calculated packet transmission rate (step S205).

Next, an operation of the home agent 20 when receiving the communication band registration request sent from the foreign agent 30B as described above will be explained using a flowchart shown in FIG. 6B.

First, the home agent 20 receives the communication band registration request sent from the foreign agent 30B and stores the communication band registration request in the binding storing device 23 (step S211). The home agent 20 updates a value of the care-of address table 231 set in advance, based on the stored communication band registration request (step S212). Then, the band control device 25 calculates and updates a packet transmission rate based on the updated care-of address table 231 (step S213).

The packet routing device 24 generates an IP header whose destination address is the care-of address of the care-of address table 231, and performs a process (encapsulation) to add the IP header to the packet sent from the partner terminal 60 (step S214). The packet routing device 24 transmits the encapsulated packet to the care-of address and controls a packet transmission amount based on the updated packet transmission rate (step S215).

With this, the packet can be sent at a transmission rate corresponding to the notified communication band used by the mobile terminal 50, and then an overflow of the communication data generated at a radio link whose communication band is limited can be suppressed. Consequently, the data loss and the communication delay can be decreased.

Also, even when some changes occur in the radio communication band used by the mobile terminal 50 due to a state of communication traffic of the network or a radio wave condition, the packet can be transmitted at a transmission rate corresponding to the changed radio communication band.

[Explanation of the Operation of the Second Exemplary Embodiment]

Here, an operation of mobile IP control system according to the second exemplary embodiment as described above will be explained using a sequence chart shown in FIG. 10.

First, the mobile terminal 50 establishes a radio connection with the access router 40B (step S31). Next, the mobile terminal 50 obtains a care-of address (CoA2) assigned by the foreign agent 30B (step S32), and transmits the position registration request to the home agent 20 (step S33). Next, the foreign agent 30B receives the position registration request and transmits a Bearer request to the access router 40B (step S34). The access router 40B returns a Bearer response with respect to the Bearer request (step S35). The foreign agent 30B adds Bearer information contained in the received Bearer response to the received position registration request and forwards the position registration request to the home agent 20 (step S36).

The home agent 20 receives the position registration request and returns the position registration response to the mobile terminal 50 (step S37). With this, the packet communication between the home agent 20 and the mobile terminal 50 becomes possible.

Here, the home agent 20 receives the packet sent from the partner terminal 60 to the mobile terminal 50 (step S38) and forwards the received packet to the mobile terminal 50 by operating such as shown in FIG. 6A (step S39).

The forwarded packet is received and decapsulated by the foreign agent 30B and forwarded to the mobile terminal 50 (step S40).

The foreign agent 30B transmits the Bearer request to the access router 40B periodically (step S41). The access router 40B which receives the Bearer request notifies the foreign agent 30B of the communication band used between the mobile terminal 50 and the access router 40B by returning the Bearer response (step S42). The foreign agent 30B generates the communication band registration request based on the received Bearer response and transmits it to the home agent 20 (step S43).

The home agent 20 which received the communication band registration request returns the communication band registration response to the foreign agent 30B (step S44) and transmits the packet received from the partner terminal 60 to the mobile terminal 50 by operating in such a manner as shown in FIG. 6B (step S45).

The foreign agent 30B which receives the packet forwards the packet to the mobile terminal 50 in such a manner as described in step S40 (step S46).

As described above, in the second exemplary embodiment, the transmission rate at which the packet is transmitted from the home agent 20 to the mobile terminal 50 can be controlled according to the communication band of the mutual radio communication between the mobile terminal 50 and the radio base station 40B in the wireless LAN network 14.

Also, when the communication band of the mutual radio communication is changed, the foreign agent 30B detects the change of the communication band, and the transmission rate at which the packet is transmitted to the mobile terminal 50 can be controlled in response to the change of the actual communication band flexibly, by notifying the home agent 20 of a newly detected communication band.

Further, since the speed (transmission rate) of the packet which flows on the network can be maintained at a constant level, a load according to the communication processing on the radio base station 40B can be decreased.

Also, even when the mobile terminal 50 in the mobile phone network switches its radio connection destination to another radio base station in a state of maintaining a radio communication session, a handover can be realized smoothly without having the packet loss or the communication delay. Therefore, a QoS for guaranteeing a quality of the communication can be realized even with a limited band in the wireless LAN network 14.

Third Exemplary Embodiment

Next, a mobile IP control system according to a third exemplary embodiment of the invention will be explained. Here, the same reference numerals are denoted for the same portions as in the first and second exemplary embodiments described above.

The third exemplary embodiment of the mobile IP control system includes a home agent 20 which manages in-network positional information of a mobile terminal 50 provided in advance, a home network 12 to which the home agent 20 belongs, and an IP network 11 as a universal communication network to which the home agent 20 connects via a communication line, as shown in FIG. 11.

Also, the third exemplary embodiment includes: a WiMAX core network 150 which is connected to the IP network 11 via a communication line; a foreign agent 30C which is connected to the WiMAX core network 150 and relays the mutual communication between the home agent 20 and the mobile terminal 50; and a radio base station 40C which is connected to the foreign agent 30C and presents a radio connection link to the mobile terminal 50, where the mobile terminal 50 is located in an area from which a radio connection to the radio base station 40C is possible.

Further, a partner terminal 60 which performs an IP packet communication with the mobile terminal 50 via the home agent 20 is being connected to the IP network 11.

Here, the foreign agent 30C and the radio base station 40C configure a foreign network 151 by including a terminal and a device which are wirelessly connected to the radio base station 40C. Further, the WiMAX core network 150 and the foreign network 151 which is connected to the WiMAX core network 150 configures a WiMAX network 15.

Note that the WiMAX network 15 may be configured such that a plurality of foreign networks configured in the same manner as the foreign network 151 (for example, foreign network 152, 153, . . . ) are connected to the WiMAX core network 150.

With this, the mobile terminal 50 can perform a communication in the WiMAX network 15 by switching each of the foreign networks as a wireless connecting destination (handover operation).

The home network 12 is a home link of the mobile terminal 50, configured so as to include the home agent 20 which manages the positional information of the mobile terminal 50, as described above. Therefore, the home address which is uniquely assigned to the mobile terminal 50 contains the same prefix as the home network 12. The home agent 20 operates as a proxy for the mobile terminal 50, and forwards a packet which is transmitted to the home address of the mobile terminal 50 from the partner terminal 60 to an address of the mobile terminal 50 in the foreign network 151 (hereinafter referred to as "care-of address").

A typical configuration of the home agent 20 includes: a transmission/reception interface 21 which is connected to the IP network 11 via a communication line; a packet storing device 22 which receives the packet transmitted from the partner terminal 60 via the transmission/reception interface 21 and holds the packet temporary; a binding storing device 23 which stores the positional information of the mobile terminal 50; a packet routing device 24 which forwards the packet based on the stored positional information of the mobile terminal 50; and a band control device 25 which controls the transmission rate of the packet transmitted by the packet routing device 24, as shown in FIG. 2.

Hereinafter, the embodiment will be described in detail.

The above-described transmission/reception interface 21 of the home agent 20 is connected to the IP network 11 and the home network 12, receives the packet transmitted from the partner terminal 60 to the home address of the mobile terminal 50 and sends the packet to the mobile terminal 50.

Note that, when the mobile terminal 50 is connected to the home network 12, the packet transmitted from the partner terminal 60 is forwarded to the mobile terminal 50 via the home network 12.

Also, the transmission/reception interface 21 has a position registration response function for receiving a message notifying the transmission/reception interface 21 of the positional information of the mobile terminal 50 when the mobile terminal 50 connects to a network other than the home network 12 (hereinafter referred to as "position registration request") and returning a position registration response with respect to the position registration request.

Further, the transmission/reception interface 21 has a communication band registration response function for receiving a communication band registration request that is a message with which the foreign agent 30C notifies the transmission/reception interface 21 of the communication band used by the mobile terminal 50 and returning a communication band registration response with respect to the communication band registration request.

Here, the above-described position registration request contains radio communication type information containing a type of the communication used for the mutual radio communication between the mobile terminal 50 and the radio base station 40C and a value of a communication band (upstream band and downstream band) thereof (hereinafter referred to as "Bearer information"), and an ID for identifying the mobile terminal 50 and a care-of address of the mobile terminal 50.

Also, the communication band registration request contains the ID for identifying the mobile terminal 50 and Bearer information of the mutual radio communication performed between the mobile terminal 50 and the radio base station 40C.

The packet storing device 22 has a packet holding function for receiving the packet transmitted from the partner terminal 60 to the home address of the mobile terminal 50, and holding the packet temporary, as described.

The binding storing device 23 has a registration request storing function for receiving and storing the position registration request sent from the mobile terminal 50 via the foreign agent 30C and the communication band registration request sent from the foreign agent 30C.

Also, the binding storing device 23 has a forwarding destination table generating function for generating a forwarding destination table 231 by associating a care-of address contained in the stored position registration request and the home address of the mobile terminal 50, and a forwarding destination table update function for updating a value of the forwarding destination table 231 based on a newly received position registration request and the communication band registration request.

The forwarding destination table 231 is constructed of an ID for identifying the mobile terminal 50, a home address, a care-of address, the Bearer information, and a packet transmission rate value (initial value is zero) calculated by the band control device 25 described later, as shown in FIG. 3.

The packet routing device 24 has a forwarding destination obtaining function for obtaining a care-of address corresponding to the mobile terminal 50 based on the forwarding destination table 231 of the binding storing device 23, a forwarding destination encapsulating function for performing a process to add an IP header indicating the obtained care-of address to a packet stored in the packet storing device 22 (hereinafter referred to as "encapsulating process"), and a communication path control function for transmitting the encapsulated packet and controlling a forwarding path of the packet based on the care-of address.

Note that the packet routing device 24 may have a forwarding priority determining function for determining a priority of a forwarding order and a transmission rate for the packet according to a type of the packet to be forwarded.

The band control device 25 includes: a transmission rate calculating function for calculating a transmission rate at the time when the packet routing device 24 forwards the packet to the mobile terminal 50, based on the forwarding destination table 231 of the binding storing device 23, and a transmission rate update function for updating the value of the forwarding destination table 231 by using the calculated transmission rate.

Also, the band control device 25 includes a packet transmission control function for controlling the transmission speed of the packet based on the calculated transmission rate value. With the packet transmission control function, the transmission speed of the packet is determined based on the calculated transmission rate value, and a packet transmission flow amount is controlled, by limiting temporary for example, on monitoring a frequency and speed at which the communication band packet transmission is performed.

With this, it becomes possible to suppress the transmission of a large amount of the packets to the radio base station and the radio relay devices such as the access router, which exceeds the radio relaying ability thereof, and also, suppress the shortage in transmission band of the radio relay device as well as the generation of an overflow.

The foreign agent 30C described above includes: a foreign communication interface 31C which connects to the radio base station 40C and performs the data transmission/reception; a care-of address assigning device 32C which transmits and assigns the foreign address to the mobile terminal 50 via the foreign communication interface 31C; a communication band detecting device 33C which detects the communication band of the radio communication performed between the mobile terminal 50 to which the care-of address is assigned and the radio base station 40C; a registration request storing device 34C which holds a position registration request sent from the mobile terminal 50 temporary and adds the detected communication band to the position registration request; and a packet forwarding device 35C which transmits the position registration request to which the communication band is added to a home agent 20 and forwards the packet sent from the home agent 20 to the mobile terminal 50, as shown in FIG. 12.

The foreign communication interface 31C performs a communication with the mobile terminal 50 via the radio base station 40C connected over a communication line.

The foreign communication interface 31C has a communication session establishing function for establishing a communication session with the mobile terminal 50 via the radio base station 40C when the mobile terminal 50 is wirelessly connected to the radio base station 40C.

The care-of address assigning device 32C has an agent advertisement sending function for sending periodically an agent advertisement message (hereinafter referred to as "agent advertisement"), which notifies of a prefix of a foreign network 15, to the mobile terminal 50 via the radio base station 40C, and a foreign address assigning function for assigning an address of a foreign network 151 (care-of address) to the mobile terminal 50 which establishes a radio connection with the radio base station 40C. This care-of address is an address to be designated as a forwarding destination when the home agent 20 forwards the packet sent from a partner terminal 60 to the mobile terminal 50.

The communication band detecting device 33C has a communication band detecting function for detecting a communication band used for the mutual radio communication between the mobile terminal 50 and the radio base station 40C (see * in the drawing), and a Bearer request transmitting function for transmitting periodically a message requesting a communication band notifying device 42C of the radio base station 40C, described later, to notify of the Bearer information (hereinafter referred to as "Bearer request").

Also, the communication band detecting device 33C includes a communication band storing table 331C which stores the Bearer information of a Bearer response notified from the radio base station 40C responding to the Bearer request, and has a band storing table update function for updating a value of the communication band storing table 331C based on a newly received Bearer response. FIG. 5A shows an example of the communication band storing table 331C.

The value of the care-of address corresponding table 331C may be set so as to be deleted at a predetermined time interval. With this, when a care-of address of the corresponding mobile terminal is changed, the packet can be prevented from being forwarded to a previous care-of address.

The registration request forwarding device 34C has: a position registration request holding function for receiving a position registration request sent from the mobile terminal 50 and holding it temporary; a Bearer information adding function for adding Bearer information based on the communication band storing table 331C to the position registration request; and a position registration request forwarding function for transmitting the position registration request to which the Bearer information is added to the home agent 20 via a packet forwarding device 35C described later.

Here, FIG. 5B shows a form of Bearer information added to the position registration request described above. For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34C has a band registration request generating function for generating a communication band registration request including the Bearer information based on the updated communication band storing table 331, and a registration request forwarding function for transmitting the communication band registration request to the home agent 20 via the packet forwarding device 35C described later.

The packet forwarding device 35C has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34C to the home agent 20.

The radio base station 40C includes a radio interface 41C which presents a radio link to the mobile terminal 50 and a communication band notifying device 42C which detects a communication band used for the mutual radio communication between the radio interface 41C and the mobile terminal 50, as shown in FIG. 12.

The communication band notifying device 42C has a communication band detecting function, which is executed in response to a change occurred in the communication band of the mutual radio communication between the radio interface 41C and the mobile terminal 50, for detecting the changed communication band, and a communication band notifying function for notifying the communication band detecting device 33C in the foreign agent 30C of the detected communication band.

Also, the communication band notifying device 42C has a Bearer response generating function for generating a Bearer response which includes Bearer information used for the radio communication with the mobile terminal 50 in response to the Bearer request sent from the communication band detecting device 33C and a Bearer response returning function for transmitting the Bearer response to the communication band detecting device 33C.

Further, the communication band notifying device 42C may be configured so as to always detect the communication band of the mutual radio communication between the radio interface 41C and the mobile terminal 50, that is, may be configured such that the communication band detecting function is always executed.

The mobile terminal 50 has the unique home address which is set in advance in the home network 12 (corresponding to a unique address) and the ID for identifying the mobile terminal, as described.

Also, the mobile terminal 50 has a radio wave intensity determining device which determines the radio wave having the highest intensity among the radio waves received at a visited location, and a radio connection establishing device which establishes a radio connection call with the radio relay device from which the radio wave is originated (radio base station 40C in the exemplary embodiment).

Further, the mobile terminal 50 has a connecting destination determining function for determining whether or not the radio connecting destination is the home network based on the agent advertisement sent from the foreign agent 30C, and a position registration request transmitting function for generating a position registration request containing the assigned care-of address and transmitting the position registration request to the home agent 20 when the radio connecting destination is determined not to be the home network 12.

With this, the care-of address assigned to the mobile terminal 50 is notified to the home agent 20, and then the mobile terminal 50 becomes possible to receive the packet from the partner terminal 60.

Here, an operation of the home agent 20 when receiving the position registration request sent from the mobile terminal 50 as described above will be explained using a flowchart shown in FIG. 6A.

First, the home agent 20 receives the position registration request sent from the mobile terminal 50 via the foreign agent 30C and stores the position registration request in the binding storing device 23 (step S201). The home agent 20 generates a care-of address table 231 based on the stored position registration request (step S202). Then, the band control device 25 calculates a packet transmission rate based on the care-of address table 231 (step S203).

The packet routing device 24 generates an IP header whose destination address is the care-of address of the care-of address table 231, and performs a process (encapsulation) to add the IP header to the packet stored in the packet storing device 22 (step S204).

The packet routing device 24 transmits the encapsulated packet to the care-of address and controls a transmission amount of the packet based on the calculated packet transmission rate (step S205).

Next, an operation of the home agent 20 when receiving the communication band registration request sent from the foreign agent 30C as described above will be explained using a flowchart shown in FIG. 6B.

First, the home agent 20 receives the communication band registration request sent from the foreign agent 30C and stores the communication band registration request in the binding storing device 23 (step S211). The home agent 20 updates a value of the care-of address table 231 set in advance, based on the stored communication band registration request (step S212). Then, the band control device 25 calculates and updates a packet transmission rate based on the updated care-of address table 231 (step S213).

The packet routing device 24 generates an IP header whose destination address is the care-of address of the care-of address table 231, and performs a process (encapsulation) to add the IP header to the packet sent from the partner terminal 60 (step S214). The packet routing device 24 transmits the encapsulated packet to the care-of address and controls a transmission amount of the packet based on the updated packet transmission rate (step S215).

With this, the packet can be sent at a transmission rate corresponding to the notified communication band to be used by the mobile terminal 50, and then an overflow of the communication data generated at a radio link whose communication band is limited can be suppressed. Consequently, the data loss and the communication delay can be decreased.

Also, even when some changes occur in the radio communication band used by the mobile terminal 50 due to a state of communication traffic of the network or a radio wave condition, the packet can be transmitted at a transmission rate corresponding to the changed radio communication band.

[Explanation of the Operation of the Third Exemplary Embodiment]

Here, an operation of mobile IP control system according to the third exemplary embodiment as described above will be explained using a sequence chart shown in FIG. 13.

First, the mobile terminal 50 establishes a radio connection with the radio base station 40C (step S51). Next, the mobile terminal 50 obtains a care-of address (CoA3) assigned by the foreign agent 30C (step S52), and transmits the position registration request to the home agent 20 (step S53). Next, the foreign agent 30C receives the position registration request and transmits a Bearer request to the radio base station 40C (step S54). The radio base station 40C returns a Bearer response with respect to the Bearer request (step S55). The foreign agent 30C adds Bearer information contained in the received Bearer response to the received position registration request and forwards the position registration request to the home agent 20 (step S56).

The home agent 20 receives the position registration request and returns the position registration response to the mobile terminal 50 (step S57). With this, the packet communication between the home agent 20 and the mobile terminal 50 becomes possible.

Here, the home agent 20 receives the packet sent from the partner terminal 60 to the mobile terminal 50 (step S58) and forwards the received packet to the mobile terminal 50 by operating in such a manner as shown in FIG. 6A (step S59).

The forwarded packet is received and decapsulated by the foreign agent 30C and forwarded to the mobile terminal 50 (step S60).

Here, the mobile terminal 50 moves in such a direction as leaving away from the radio base station 40C. With this, the radio wave used for the communication between the mobile terminal 50 and the radio base station 40C is attenuated and the communication band capacity is decreased (step S61).

The radio base station 40C which detects the change in Bearer information notifies the foreign agent 30C of a value of the communication band after the Bearer information is changed (step S62).

The foreign agent 30C generates a communication band registration request and transmits it to the home agent 20 (step S63).

The home agent 20 which receives the communication band registration request returns a communication band registration response to the foreign agent 30C (step S64) and forwards the received packet from the partner terminal 60 to the mobile terminal 50 by operating as shown in FIG. 6B (step S65).

The foreign agent 30C which receives the packet forwards the packet to the mobile terminal 50 in the same manner as described in step S80 (step S66).

As described above, in the third exemplary embodiment, the transmission rate of the packet transmitted from the home agent 20 to the mobile terminal 50 can be controlled according to the communication band of the mutual radio communication between the mobile terminal 50 and the radio base station 40C in the WiMAX network 15.

Also, when the communication band of the mutual radio communication is changed, the foreign agent 30C detects the change of the communication band, and the transmission rate of the packet transmitted to the mobile terminal 50 can be controlled flexibly in response to the change of the actual communication band, by notifying the home agent 20 of a newly detected communication band.

Further, since the speed (transmission rate) of the packet which flows on the network can be maintained at a constant level, a load according to the communication processing on the radio base station 40C can be decreased.

Also, even when the mobile terminal 50 in the mobile phone network switches a radio connection destination to another radio base station in a state of maintaining a radio communication session, a handover can be realized smoothly without having the packet loss and the communication delay. Therefore, a QoS for guaranteeing a quality of the communication can be realized even with a limited band in the WiMAX network 15.

Fourth Exemplary Embodiment

Next, a mobile IP control system according to a fourth exemplary embodiment of the invention will be explained. Here, the same reference numerals are denoted for the same portions as in the first, second, and third exemplary embodiments described above.

The fourth exemplary embodiment of the mobile IP control system includes a home agent 20 which manages in-network positional information of a mobile terminal 50 provided in advance, a home network 12 to which the home agent 20 belongs, and an IP network 11 as a universal communication network to which the home agent 20 connects via a communication line, as shown in FIG. 14.

Also, the fourth exemplary embodiment includes: a VPN (Virtual Private Network) core network 160 which is connected to the IP network 11 via a communication line; a VPN gateway 70A which is connected to the VPN core network 160 and sets a VPN tunnel with the mobile terminal 50; a foreign agent 30D which is provided in the VPN gateway 70A and relays the mutual communication between the home agent 20 and the mobile terminal 50; and access routers 40D and 40E connected to the foreign agent 30D in parallel, each of which presents a radio connection link to the mobile terminal 50, where the mobile terminal 50 is located in an area from which a radio connection to the access router 40D is possible.

Further, a partner terminal 60 which performs an IP packet communication with the mobile terminal 50 via the home agent 20 is being connected to the IP network 11.

Here, the foreign agent 30D and the access router 40D configure a foreign network 161 by including a terminal and a device which are wirelessly connected to the access router 40D, and the foreign agent 30D and the access router 40E also configure a foreign network 162 by including a terminal and a device which are wirelessly connected to the access router 40E (see FIG. 15). Further, the VPN core network 160 and the foreign networks 161 and 162 which are connected to the VPN core network 160 configure a VPN network 16.

Note that the VPN network 16 may be configured such that a plurality of foreign networks configured in the same manner as the foreign networks 161 and 162 are connected to the VPN core network 160 (for example, foreign network 163, 164, . . . ) via a VPN gateway (for example, VPN gateway 70B, 70C . . . ) of each foreign network.

With this, the mobile terminal 50 can perform a communication (perform a handover) in the VPN network 16 by switching each of the foreign networks as a radio connecting destination.

The home network 12 is a home link of the mobile terminal 50, configured so as to include the home agent 20 which manages the positional information of the mobile terminal 50, as described above. Therefore, the home address which is uniquely assigned to the mobile terminal 50 contains the same prefix as the home network 12. The home agent 20 operates as a proxy for the mobile terminal 50, and forwards a packet which is transmitted to the home address of the mobile terminal 50 from the partner terminal 60 to an address (hereinafter referred to as "care-of address") of the mobile terminal 50 in the foreign network (either one of the foreign networks 161 and 162 to which the mobile terminal 50 is connected wirelessly, in this exemplary embodiment).

A typical configuration of the home agent 20 includes: a transmission/reception interface 21 which is connected to the IP network 11 via a communication line; a packet storing device 22 which receives the packet transmitted from the partner terminal 60 via the transmission/reception interface 21 and holds the packet temporary; a binding storing device 23 which stores the positional information of the mobile terminal 50; a packet routing device 24 which forwards the packet based on the stored positional information of the mobile terminal 50; and a band control device 25 which controls the transmission rate of the packet transmitted by the packet routing device 24, as shown in FIG. 2.

Hereinafter, the embodiment will be described in detail.

The above-described transmission/reception interface 21 of the home agent 20 is connected to the IP network 11 and the home network 12, receives the packet transmitted from the partner terminal 60 to the home address of the mobile terminal 50 and sends the packet to the mobile terminal 50.

Note that, when the mobile terminal 50 is connected to the home network 12, the packet transmitted from the partner terminal 60 is forwarded to the mobile terminal 50 via the home network 12.

Also, the transmission/reception interface 21 has a position registration response function for receiving a message which notifies the transmission/reception interface 21 of the positional information (containing the care-of address) of the mobile terminal 50 when the mobile terminal 50 connects to a network other than the home network 12 (hereinafter referred to as "position registration request"), and returning a position registration response with respect to the position registration request.

Further, the transmission/reception interface 21 has a communication band registration response function for receiving a communication band registration request that is a message with which the foreign agent 30 notifies the transmission/reception interface 21 of the communication band used by the mobile terminal 50, and returning a communication band registration response with respect to the communication band registration request.

Here, the above-described position registration request contains an ID for identifying the mobile terminal 50, a care-of address of the mobile terminal 50, and radio communication type information including a type of the communication used for the mutual radio communication between the mobile terminal 50 and the radio base station 40C and a value of a communication band (upstream band and downstream band) thereof (hereinafter referred to as "Bearer information").

Also, the communication band registration request contains the ID for identifying the mobile terminal 50 and Bearer information of the mutual radio communication performed between the mobile terminal 50 and the access router 40D.

The packet storing device 22 has a packet holding function for receiving the packet transmitted from the partner terminal 60 to the home address of the mobile terminal 50, and holding the packet temporary, as described.

The binding storing device 23 has a registration request storing function for receiving and storing the position registration request sent from the mobile terminal 50 via the foreign agent 30 and the communication band registration request sent from the foreign agent 30.

Also, the binding storing device 23 has a forwarding destination table generating function for generating a forwarding destination table 231 by associating a care-of address contained in the stored position registration request and the home address of the mobile terminal 50, and a forwarding destination table update function for updating a value of the forwarding destination table 231 based on a newly received communication band registration request.

The forwarding destination table 231 is constructed of the ID for identifying the mobile terminal 50, the home address, the care-of address, the Bearer information, and a packet transmission rate value (initial value is zero) calculated by the band control device 25 described later, as shown in FIG. 3.

The packet routing device 24 has a forwarding destination obtaining function for obtaining a care-of address corresponding to the mobile terminal 50 based on the forwarding destination table 231 of the binding storing device 23, a forwarding destination encapsulating function for performing a process to add an IP header indicating the obtained care-of address to a packet stored in the packet storing device 22 (hereinafter referred to as "encapsulating process"), and a communication path control function for transmitting the encapsulated packet and controlling a forwarding path of the packet based on the care-of address.

Note that the packet routing device 24 may have a forwarding priority determining function for determining a priority of a forwarding order and a transmission rate for the packet according to a type of the packet to be forwarded.

The band control device 25 includes: a transmission rate calculating function for calculating a transmission rate of the packet at the time when the packet routing device 24 forwards the packet to the mobile terminal 50, based on the forwarding destination table 231 of the binding storing device 23, and a transmission rate update function for updating the value of the forwarding destination table 231 by using the calculated transmission rate.

Also, the band control device 25 includes a packet transmission control function for controlling the transmission speed of the packet based on the calculated transmission rate value. With this packet transmission control function, the transmission speed of the packet is determined based on the calculated transmission rate value, and a packet transmission flow amount is controlled, by limiting the packet transmission flow amount temporary for example, on monitoring a frequency and speed at which the communication band packet transmission is performed.

With this, it becomes possible to suppress the transmission of a large amount of the packets to the radio base station and the radio relay devices such as the access router, which exceeds the radio relaying ability thereof, and also, suppress the shortage in transmission band of the radio relay device as well as the generation of an overflow.

The VPN gateway 70A described above is configured so as to include a VPN connection establishing device 71A which sets a VPN (Virtual Private Network) communication transmission path (hereinafter referred to as "VPN tunnel") between the VPN gateway 70A and the mobile terminal 50, and a foreign agent 30D which is connected to the access routers 40D and 40E via the VPN connection establishing device 71A, as shown in FIG. 15.

The VPN connection establishing device 71A has a VPN setting function for setting the VPN tunnel with the mobile terminal 50 and a VPN packet transmitting/receiving function for transmitting/receiving the packet via the VPN tunnel.

With the VPN setting function, the packet transmitted/received via the VPN tunnel which is set with the mobile terminal 50 is encapsulated by other packet prior to the transmission.

With this, the communication of the encapsulated packet is distinguished from other communications. Therefore, the interference by other communication signal or noise can be inhibited.

Also, with the VPN packet transmitting/receiving function, the communication data transmitted/received with the mobile terminal 50 is encrypted by, for example, an IPsec, and an origination, a destination, and a content of the message contained in the packet are authenticated.

As the result, the packet transmitted/received via the VPN tunnel is free from eavesdropping, falsification, or noise data incorporation, and thus a stable communication quality can be ensured.

The foreign agent 30D described above includes: a foreign communication interface 31D which connects to the access routers 40D and 40E and performs the data transmission/reception with each access router; a care-of address assigning device 32D which transmits and assigns the foreign address to the mobile terminal 50 via the foreign communication interface 31D; a communication band detecting device 33D which detects the communication band of the radio communication performed between the mobile terminal 50 to which the care-of address is assigned and the access router 40D or 40E; a registration request storing device 34D which relays a position registration request sent from the mobile terminal 50 to the home agent 20; and a packet forwarding device 35D which forwards the registration request transferred from the registration request storing device 34D and the packet sent from the home agent 20, as shown in FIG. 15.

The foreign communication interface 31D is equipped to the access router 40D or 40E, being connected via a communication line, and performs a communication with the mobile terminal 50 via the access router 40D or 40E.

Also, the foreign communication interface 31D has a communication session establishing function for establishing a communication session with the mobile terminal 50 via the access router 40D or 40E to which the mobile terminal 50 is connected wirelessly.

The care-of address assigning device 32D has an agent advertisement sending function for sending periodically an agent advertisement message (hereinafter referred to as "agent advertisement"), which notifies of a prefix of a foreign network 161 or 162, to the mobile terminal 50 via the access router 40D or 40E, and a foreign address assigning function for assigning an address in a corresponding foreign network 160 or 161 (care-of address) to the mobile terminal 50 which establishes a wireless connection with the access router 40D or 40E. This care-of address is an address to be designated as a forwarding destination when the home agent 20 forwards the packet sent from a partner terminal 60 to the mobile terminal 50.

The communication band detecting device 33D has an echo request transmitting function for transmitting, to the mobile terminal 50, an echo request which is a message requesting a return message from the mobile terminal 50, a communication band calculation function for receiving an echo response which is the return message from the mobile terminal 50 with respect to the echo request and calculating a communication band used by the mobile terminal 50 based on a time period from the transmission of the echo request to the reception of the echo response, and a communication band registration request generating function for generating a communication band registration request containing a value of the calculated communication band and a care-of address of the mobile terminal 50.

Also, the communication band detecting device 33D includes a communication band storing table 331D which stores the Bearer information of the mobile terminal 50 containing the value of the calculated communication band, and has a band storing table update function for updating a value of the communication band storing table 331D based on a newly received echo response. FIG. 5A shows an example of the communication band storing table 331D.

Here, the echo response contains a care-of address obtained by the mobile terminal 50 and an ID for identifying the mobile terminal 50 or a home address of the mobile terminal 50.

With this, even when the communication band cannot be detected directly, the value of the communication band used by the mobile terminal 50 can be calculated and obtained by setting the VPN tunnel to a radio link of the mobile terminal 50.

Note that the value of the communication band storing table 331D may be set so as to be deleted at a predetermined time interval. With this, when a care-of address of the corresponding mobile terminal is changed, the packet can be prevented from being forwarded to a previous care-of address.

The registration request forwarding device 34D has: a position registration request holding function for receiving a position registration request sent from the mobile terminal 50 to the home agent 20 and holding it temporary; a Bearer information adding function for adding Bearer information based on the communication band storing table 331D to the position registration request; and a position registration request forwarding function for transmitting the position registration request to which the Bearer information is added to the home agent 20 via a packet forwarding device 35D described later.

Here, FIG. 5B shows an example of Bearer information added to the position registration request described above.

For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34D has a band registration request generating function for generating a communication band registration request including the Bearer information based on the updated communication band storing table 331D, and a registration request forwarding function for transmitting the communication band registration request to the home agent 20 via the packet forwarding device 35D described later.

The packet forwarding device 35D has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34D to the home agent 20.

The access router 40D includes at least a radio interface 41D which presents a radio link to the mobile terminal 50.

The radio interface 41D has a radio link presenting function for presenting a radio link for the mobile terminal 50 located in an area from which the radio communication is possible, a radio connection notifying function for notifying the foreign agent 30D that the radio connection is established by the mobile terminal 50 when the mobile terminal 50 wirelessly connects to the radio interface 41D, and a VPN tunnel relay function for relaying a VPN tunnel established between a VPN connection establishing device 71A of the VPN gateway 70A and the mobile terminal 50.

The access router 40E has almost the same configuration as the access router 40D described above, and includes at least the radio interface 41E which presents the radio link for the mobile terminal 50 as shown in FIG. 15.

The radio interface 41E has a radio link presenting function for presenting a radio link for the mobile terminal 50 located in an area from which the radio communication is possible, a radio connection notifying function for notifying the foreign agent 30D that the radio connection is established by the mobile terminal 50 when the mobile terminal 50 wirelessly connects to the radio interface 41E, and a VPN tunnel relay function for relaying a VPN tunnel established between a VPN connection establishing device 71A of the VPN gateway 70A and the mobile terminal 50.

The mobile terminal 50 has the unique home address set in advance in the home network 12 (corresponding to a unique address) and the ID for identifying the mobile terminal, as described.

Also, the mobile terminal 50 has a radio wave intensity determining device which determines the radio wave having the highest intensity among the radio waves received at a visited location, and a radio connection establishing device which establishes a radio connection call with the radio relay device from which the radio wave is originated (access router 40D or 40E in the exemplary embodiment).

Further, the mobile terminal 50 has a connecting destination determining function for determining whether or not the radio connecting destination is the home network based on the agent advertisement sent from the foreign agent 30D, and a position registration request transmitting function for generating a position registration request containing the assigned care-of address and transmitting the position registration request to the home agent 20 when the radio connecting destination is determined not to be the home network 12.

With this, the care-of address assigned to the mobile terminal 50 is notified to the home agent 20, and then the mobile terminal 50 becomes possible to receive the packet from the partner terminal 60.

Also, the mobile terminal 50 according to the exemplary embodiment has an echo response returning function for returning the echo response with respect to the echo request which is a message for requesting a return sent from the foreign agent 30.

Further, the mobile terminal 50 has a VPN tunnel setting function for setting the VPN channel with the VPN gateway 70A via the access router 40D or 40E, and a VPN packet transmitting/receiving function for transmitting/receiving the packet via the VPN tunnel.

With the VPN setting function, the mobile terminal 50 encapsulates the packet transmitted/received via the set VPN tunnel by other packet prior to the transmission. With this, the communication of the encapsulated packet is distinguished from other communications. Therefore, the interference by other communication signal or noise can be inhibited.

Also, with the VPN packet transmitting/receiving function, the communication data transmitted/received with the mobile terminal 50 is encrypted by, for example, an IPsec, and an origination, a destination, and a content of the message contained in the packet are authenticated.

As the result, the packet transmitted/received via the VPN tunnel is free from eavesdropping, falsification, or noise data incorporation, and a stable communication quality can be ensured.

Here, an operation of the home agent 20 when receiving the position registration request sent from the mobile terminal 50 as described above will be explained using a flowchart shown in FIG. 6A.

First, the home agent 20 receives the position registration request sent from the mobile terminal 50 via the foreign agent 30 and stores the position registration request in the binding storing device 23 (step S201). The home agent 20 generates a care-of address table 231 based on the stored position registration request (step S202). Then, the band control device 25 calculates a packet transmission rate based on the care-of address table 231 (step S203).

The packet routing device 24 generates an IP header whose destination address is the care-of address of the care-of address table 231, and performs a process (encapsulation) to add the IP header to the packet stored in the packet storing device 22 (step S204).

The packet routing device 24 transmits the encapsulated packet to the care-of address and controls a transmission amount of the packet based on the calculated packet transmission rate (step S205).

Next, an operation of the home agent 20 when receiving the communication band registration request sent from the foreign agent 30 as described above will be explained using a flowchart shown in FIG. 6B.

First, the home agent 20 receives the communication band registration request sent from the foreign agent 30 and stores the communication band registration request in the binding storing device 23 (step S211). The home agent 20 updates a value of the care-of address table 231 set in advance, based on the stored communication band registration request (step S212). Then, the band control device 25 calculates and updates a packet transmission rate based on the updated care-of address table 231 (step S213).

The packet routing device 24 generates an IP header whose destination address is the care-of address of the care-of address table 231, and performs a process (encapsulation) to add the IP header to the packet sent from the partner terminal 60 (step S214). The packet routing device 24 transmits the encapsulated packet to the care-of address and controls a transmission amount of the packet based on the updated packet transmission rate (step S215).

With this, the packet can be sent at a transmission rate corresponding to the notified communication band which is used by the mobile terminal 50, and then an overflow of the communication data generated at a radio link whose communication band is limited can be suppressed. Consequently, the data loss and the communication delay can be decreased.

Also, even when some changes occur in the radio communication band used by the mobile terminal 50 due to a state of communication traffic of the network or a radio wave condition, the packet can be transmitted at a transmission rate corresponding to the changed radio communication band.

[Explanation of the Operation of the Fourth Exemplary Embodiment]

Here, an operation of mobile IP control system according to the fourth exemplary embodiment as described above will be explained using a sequence chart shown in FIG. 16.

First, the mobile terminal 50 establishes a radio connection with the access router 40D (step S71). The access router 40D notifies the foreign agent 30D of the connection established with the mobile terminal 50 (step S72). The foreign agent 30D assigns a care-of address to the mobile terminal 50 (step S73). With this, the mobile terminal 50 obtains a care-of address CoA4 (step S74) and sets a VPN (step S75).

The mobile terminal 50 sends the position registration request to the home agent by using the VPN (step S76). The foreign agent 30D which receives the position registration request transmits the echo request to the mobile terminal 50 via the access router 40D (step S77). The mobile terminal 50 returns the echo response with respect to the echo request (step S78). The foreign agent 30D receives the echo response and calculates the communication band. The value of the communication band is added to the received position registration request and transmitted to the home agent 20 (step S79). The home agent 20 which receives the position registration request transmits the position registration response to the mobile terminal 50 (step S80).

With this, the packet communication between the home agent 20 and the mobile terminal 50 becomes possible.

Here, the home agent 20 receives the packet sent from the partner terminal 60 to the mobile terminal 50 (step S81) and forwards the received packet to the mobile terminal 50 by operating such as shown in FIG. 6A (step S82).

The foreign agent 30D which receives the forwarded packet performs decapsulation processing to the packet and forwards the packet to the mobile terminal 50 via the VPN connection establishing (communication) device and the access router 40D (step S83).

Here, the mobile terminal 50 moves to establish radio link with the access router 40E (step S84). The access router 40E notifies the foreign agent 30D that the connection is established by the mobile terminal 50, as described in step S72 (step S85). The foreign agent 30D assigns a care-of address newly to the mobile terminal 50 (step S86). The mobile terminal 50 obtains a care-of address CoA5 (step S87) and sets a VPN newly with the foreign agent 30D (step S88). Next, the foreign agent 30D transmits the echo request to the mobile terminal 50 via the access router 40E (step S89). The mobile terminal 50 transmits the echo response with respect to the echo request. The foreign agent which receives the echo response calculates the communication band as described in step S79 and generates the position registration request to which the value of the communication band is added and transmits it to the home agent 20 (step S91). The home agent 20 which receives the position registration request returns the position registration response to the foreign agent 30D of the VPN gateway 160A (step S92).

Next, the home agent 20 forwards the received packet from the partner terminal 60 to the mobile terminal 50 by operating as shown in FIG. 6B (step S93). The foreign agent 30 which receives the packet forwards the packet to the mobile terminal 50 as described in step S83 (step S94).

As described above, in the fourth exemplary embodiment, the transmission rate of the packet transmitted from the home agent 20 to the mobile terminal 50 can be controlled according to the communication band of the mutual radio communication between the mobile terminal 50 and the access router 40D in the VPN network 16.

By setting the VPN, even when the communication band used by the mobile terminal 50 cannot be detected directly, the communication band can be calculated.

With this, when the communication band of the mutual radio communication of the VPN is changed, the foreign agent 30D detects the change in the communication band, and the transmission rate of the packet transmitted to the mobile terminal 50 can be controlled flexibly in response to the change in the actual communication band, by notifying the home agent 20 of a newly detected communication band.

Further, since the speed (transmission rate) of the packet which flows on the network can be maintained at a constant level, a load according to the communication processing on the access router 40D can be decreased.

Also, even when the mobile terminal 50 in the mobile phone network switches a radio connection destination to another radio base station in a state of maintaining a radio communication session, a handover can be realized smoothly without having the packet loss and the communication delay. Therefore, a QoS for guaranteeing a quality of the communication can be realized even with a limited band in the VPN network 16.

Fifth Exemplary Embodiment

Next, a mobile IP control system according to a fifth exemplary embodiment of the invention will be explained. Here, the same reference numerals are denoted for the same portions as in the first, second, third, and fourth exemplary embodiments described above.

The fifth exemplary embodiment of the mobile IP control system includes a home agent 20 which manages in-network positional information of a mobile terminal 50 provided in advance, a home network 12 to which the home agent 20 belongs, and an IP network 11 as a universal communication network to which the home agent 20 connects via a communication line, as shown in FIG. 17.

Also, the fifth exemplary embodiment is configured such that a wireless LAN network 14 which is constructed in the same manner as the second exemplary embodiment and a WiMAX network 15 which is constructed in the same manner as the third exemplary embodiment are connected to an IP network 11, and the mobile terminal 50 is located in an area from which a radio connection to the access router 40B provided to the wireless LAN network 14 is possible.

Further, a partner terminal 60 which performs an IP packet communication with the mobile terminal 50 via the home agent 20 is being connected to the IP network 11.

The home network 12 is a home link of the mobile terminal 50, configured so as to include the home agent 20 which manages the positional information of the mobile terminal 50, as described above. Therefore, the home address which is uniquely assigned to the mobile terminal 50 contains a same prefix as the home network 12. The home agent 20 operates as a proxy for the mobile terminal 50, and forwards a packet which is transmitted to the home address of the mobile terminal 50 from the partner terminal 60 to a care-of address of the mobile terminal 50.

A typical configuration of the home agent 20 includes: a transmission/reception interface 21 which is connected to the IP network 11 via a communication line; a packet storing device 22 which receives the packet transmitted from the partner terminal 60 via the transmission/reception interface 21 and holds the packet temporary; a binding storing device 23 which stores the positional information of the mobile terminal 50; a packet routing device 24 which forwards the packet based on the stored positional information of the mobile terminal 50; and a band control device 25 which controls the transmission rate of the packet transmitted by the packet routing device 24, as shown in FIG. 2.

Hereinafter, the embodiment will be described in detail.

The above-described transmission/reception interface 21 of the home agent 20 is connected to the IP network 11 and the home network 12, receives the packet transmitted from the partner terminal 60 to the home address of the mobile terminal 50 and sends the packet to the mobile terminal 50.

Note that, when the mobile terminal 50 is connected to the home network 12, the transmission/reception interface 21 forwards the packet sent from the partner terminal 60 to the mobile terminal 50 in the home network 12.

Also, the transmission/reception interface 21 has a position registration response function for receiving a message notifying the transmission/reception interface 21 of the positional information of the mobile terminal 50 when the mobile terminal 50 connects to a network other than the home network 12 (hereinafter referred to as "position registration request"), and returning a position registration response with respect to the position registration request.

Further, the transmission/reception interface 21 has a communication band registration response function for receiving a communication band registration request that is a message with which the foreign agent 30B notifies the transmission/reception interface 21 of the communication band used by the mobile terminal 50, and returning a communication band registration response with respect to the communication band registration request.

Here, the above-described position registration request contains radio communication type information containing a type of the communication used for the mutual radio communication between the mobile terminal 50 and the access router 40B and a value of a communication band (upstream band and downstream band) thereof (hereinafter referred to as "Bearer information"), and an ID for identifying the mobile terminal 50 and a care-of address of the mobile terminal 50.

Also, the communication band registration request contains the ID for identifying the mobile terminal 50 and the Bearer information of the mutual radio communication performed between the mobile terminal 50 and the access router 40B.

The packet storing device 22 has a packet holding function for receiving the packet transmitted from the partner terminal 60 to the home address of the mobile terminal 50, and holding the packet temporary, as described.

The binding storing device 23 has a registration request storing function for receiving and storing the position registration request sent from the mobile terminal 50 via the foreign agent 30B and the communication band registration request sent from the foreign agent 30B.

Also, the binding storing device 23 has a forwarding destination table generating function for generating a forwarding destination table 231 by associating a care-of address contained in the stored position registration request with the home address of the mobile terminal 50, and a forwarding destination table update function for updating a value of the forwarding destination table 231 based on a newly received position registration request and the communication band registration request.

The forwarding destination table 231 is constructed of the ID for identifying the mobile terminal 50, the home address, the care-of address, the Bearer information, and a packet transmission rate value (initial value is zero) calculated by the band control device 25 described later, as shown in FIG. 3.

The packet routing device 24 has a forwarding destination obtaining function for obtaining a care-of address corresponding to the mobile terminal 50 based on the forwarding destination table 231 of the binding storing device 23, a forwarding destination encapsulating function for performing a process to add an IP header indicating the obtained care-of address to a packet stored in the packet storing device 22 (hereinafter referred to as "encapsulating processing"), and a communication path control function for transmitting the encapsulated packet and controlling a forwarding path of the packet based on the care-of address.

Note that the packet routing device 24 may have a forwarding priority determining function for determining a priority of a forwarding order and a transmission rate for the packet according to a type of the packet to be forwarded.

The band control device 25 includes: a transmission rate calculating function for calculating a transmission rate at the time when the packet routing device 24 forwards the packet to the mobile terminal 50, based on the forwarding destination table 231 of the binding storing device 23, and a transmission rate update function for updating the value of the forwarding destination table 231 by using the calculated transmission rate.

Also, the band control device 25 has a packet transmission control function for controlling the transmission speed of the packet based on the calculated transmission rate value. With the packet transmission control function, the transmission speed of the packet is determined based on the calculated transmission rate value, and a packet transmission flow amount is controlled, by limiting temporary for example, on monitoring a frequency and speed at which the communication band packet transmission is performed.

With this, it becomes possible to suppress the transmission of a large amount of the packets to the radio base station and the radio relay devices such as the access router, which exceeds the radio relaying ability thereof, and also, suppress the shortage in transmission band of the radio relay device as well as the generation of an overflow.

The foreign agent 30B provided to the wireless LAN network 14 described above includes: a foreign communication interface 31B which performs a communication with the access router 40B; a care-of address assigning device 32B which transmits and assigns the foreign address to the mobile terminal 50 via the foreign communication interface 31B; a communication band detecting device 33B which detects the communication band of the radio communication performed between the mobile terminal 50 to which the care-of address is assigned and the access router 40B; a registration request storing device 34B which holds a position registration request sent from the mobile terminal 50 temporary and adds the detected communication band to the position registration request; and a packet forwarding device 35B which transmits the position registration request to which the communication band is added to a home agent 20 and forwards the packet sent from the home agent 20 to the mobile terminal 50, as shown in FIG. 9.

The foreign communication interface 31B performs a communication with the mobile terminal 50 via the access router 40B connected over a communication line.

The foreign communication interface 31B has a communication session establishing function for establishing a communication session with the mobile terminal 50 via the access router 40B when the mobile terminal 50 is wirelessly connected to the access router 40B.

The care-of address assigning device 32B has an agent advertisement sending function for sending periodically an agent advertisement message (hereinafter referred to as "agent advertisement"), which notifies of a prefix of a foreign network 15, to the mobile terminal 50 via the access router 40B, and a foreign address assigning function for assigning an address of a foreign network 141 (care-of address) to the mobile terminal 50 which establishes a radio connection with the access router 40B. This care-of address is an address to be designated as a forwarding destination when the home agent 20 forwards the packet sent from a partner terminal 60 to the mobile terminal 50.

The communication band detecting device 33B has a communication band detecting function for detecting a communication band used for the mutual radio communication between the mobile terminal 50 and the access router 40B (see *B in FIG. 9), and a Bearer request transmitting function for transmitting periodically a message requesting a communication band notifying device 42B of the access router 40B, described later, to notify of the Bearer information (hereinafter referred to as "Bearer request").

Also, the communication band detecting device 33B includes a communication band storing table 331B which stores the Bearer information of a Bearer response notified from the access router 40B responding to the Bearer request, and has a band storing table update function for updating a value of the communication band storing table 331B based on a newly received Bearer response. FIG. 5A shows an example of the communication band storing table 331B.

Note that the value of the communication band storing table 331B may be set so as to be deleted at a predetermined time interval. With this, when a care-of address of the corresponding mobile terminal is changed, the packet can be prevented from being forwarded to a previous care-of address.

The registration request forwarding device 34B has: a position registration request holding function for receiving a position registration request sent from the mobile terminal 50 and holding it temporary; a Bearer information adding function for adding Bearer information based on the communication band storing table 331B to the position registration request; and a position registration request forwarding function for transmitting the position registration request to which the Bearer information is added to the home agent 20 via a packet forwarding device 35B described later.

Here, FIG. 5B shows a form of Bearer information added to the position registration request described above. For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34B has a band registration request generating function for generating a communication band registration request including the Bearer information based on the updated communication band storing table 331, and a registration request forwarding function for transmitting the communication band registration request to the home agent 20 via the packet forwarding device 35B described later.

The packet forwarding device 35B has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34 to the home agent 20.

The access router 40B includes a radio interface 41B which presents a radio link to the mobile terminal 50 and a communication band notifying device 42B which detects a communication band used for the mutual radio communication between the radio interface 41B and the mobile terminal 50, as shown in FIG. 9.

The communication band notifying device 42B has a communication band detecting function, which is executed in response to a change occurred in the communication band of the mutual radio communication between the radio interface 41B and the mobile terminal 50, for detecting the changed communication band, and a communication band notifying function for notifying the communication band detecting device 33B in the foreign agent 30B of the detected communication band.

Also, the communication band notifying device 42B has a Bearer response generating function for generating a Bearer response which includes Bearer information used for the radio communication with the mobile terminal 50 in response to the Bearer request sent from the communication band detecting device 33B and a Bearer response returning function for transmitting the Bearer response to the communication band detecting device 33B.

Note that the communication band notifying device 42B may be configured so as to always detect the communication band of the mutual radio communication between the radio interface 41B and the mobile terminal 50, that is, may be configured such that the communication band detecting function is always executed.

The foreign agent 30C provided to the WiMAX network 15 described above includes: a foreign communication interface 31C which connects to the radio base station 40C and performs the data transmission/reception; a care-of address assigning device 32C which transmits and assigns the foreign address to the mobile terminal 50 via the foreign communication interface 31C; a communication band detecting device 33C which detects the communication band of the radio communication performed between the mobile terminal 50 to which the care-of address is assigned and the access router 40C; a registration request storing device 34C which holds a position registration request sent from the mobile terminal 50 temporary and adds the detected communication band to the position registration request; and a packet forwarding device 35C which transmits the position registration request to which the communication band is added to a home agent 20 and forwards the packet sent from the home agent 20 to the mobile terminal 50, as shown in FIG. 12.

The foreign communication interface 31C performs a communication with the mobile terminal 50 via the radio base station 40C connected over a communication line.

The foreign communication interface 31C has a communication session establishing function for establishing a communication session with the mobile terminal 50 via the radio base station 40C when the mobile terminal 50 is wirelessly connected to the radio base station 40C.

The care-of address assigning device 32C has an agent advertisement sending function for sending periodically an agent advertisement message (hereinafter referred to as "agent advertisement"), which notifies of a prefix of a foreign network 15, to the mobile terminal 50 via the radio base station 40C, and a foreign address assigning function for assigning an address of a foreign network 151 (care-of address) to the mobile terminal 50 which establishes a radio connection with the radio base station 40C. This care-of address is an address to be designated as a forwarding destination when the home agent 20 forwards the packet sent from a partner terminal 60 to the mobile terminal 50.

The communication band detecting device 33C has a communication band detecting function for detecting a communication band used for the mutual radio communication between the mobile terminal 50 and the radio base station 40C (see * in the drawing), and a Bearer request transmitting function for transmitting periodically a message requesting a communication band notifying device 42C of the radio base station 40C, described later, to notify of the Bearer information (hereinafter referred to as "Bearer request").

Also, the communication band detecting device 33C includes a communication band storing table 331C which stores the Bearer information of a Bearer response notified from the radio base station 40C responding to the Bearer request, and has a band storing table update function for updating a value of the communication band storing table 331C based on a newly received Bearer response. FIG. 5A shows an example of the communication band storing table 331C.

Note that the value of the communication band storing table 331C may be set so as to be deleted at a predetermined time interval. With this, when a care-of address of the corresponding mobile terminal is changed, the packet can be prevented from being forwarded to a previous care-of address.

The registration request forwarding device 34C has: a position registration request holding function for receiving a position registration request sent from the mobile terminal 50 and holding it temporary; a Bearer information adding function for adding Bearer information based on the communication band storing table 331 to the position registration request; and a position registration request forwarding function for transmitting the position registration request to which the Bearer information is added to the home agent 20 via a packet forwarding device 35C described later.

Here, FIG. 5B shows a form of Bearer information added to the position registration request described above. For example, a value "9" in a "type" field indicates that a following message is the Bearer information. Also, a value "12" in a "length" field indicates a length of a following message, a value in a "Bearer type" field indicates a type of the radio communication (for example, W-CDMA=1, WLAN=2, WiMAX=3, VPN=4), and a value in each of an "upstream capacity" field and a "downstream capacity" field indicates a calculated communication band used by the mobile terminal.

Also, the registration request forwarding device 34C has a band registration request generating function for generating a communication band registration request including the Bearer information based on the updated communication band storing table 331, and a registration request forwarding function for transmitting the communication band registration request to the home agent 20 via the packet forwarding device 35C described later.

The packet forwarding device 35C has: a decapsulating/forwarding function for eliminating an IP header part of the packet sent from the home agent 20 (decapsulation processing) and forwarding the decapsulated packet to the mobile terminal 50; a registration response forwarding function for forwarding a position registration response sent from the home agent 20 to the mobile terminal 50; and a registration request sending function for sending the position registration request and the communication band registration request transferred from the registration request forwarding device 34 to the home agent 20.

The radio base station 40C includes a radio interface 41C which presents a radio link to the mobile terminal 50 and a communication band notifying device 42C which detects a communication band used for the mutual radio communication between the radio interface 41C and the mobile terminal 50, as shown in FIG. 12. The communication band notifying device 42C has a communication band detecting function, which is executed in response to a change occurred in the communication band of the mutual radio communication between the radio interface 41C and the mobile terminal 50, for detecting the changed communication band, and a communication band notifying function for notifying the communication band detecting device 33C in the foreign agent 30C of the detected communication band.

Also, the communication band notifying device 42C has a Bearer response generating function for generating a Bearer response which includes Bearer information used for the radio communication with the mobile terminal 50 in response to the Bearer request sent from the communication band detecting device 33C and a Bearer response returning function for transmitting the Bearer response to the communication band detecting device 33C.

Note that the communication band notifying device 42C may be configured so as to always detect the communication band of the mutual radio communication between the radio interface 41C and the mobile terminal 50, that is, may be configured such that the communication band detecting function is always executed.

The mobile terminal 50 has the unique home address set in advance in the home network 12 (corresponding to a unique address) and the ID for identifying the mobile terminal, as described.

Also, the mobile terminal 50 has a radio wave intensity determining device which determines the radio wave having the highest intensity among the radio waves received at a visited location, and a radio connection establishing device which establishes a radio connection call with the radio relay device from which the radio wave is originated (the access router 40B or the radio base station 40C in the exemplary embodiment).

Further, the mobile terminal 50 has a connecting destination determining function for determining whether or not the radio connecting destination is the home network, based on the agent advertisement sent from the foreign agent 30C, and a position registration request transmitting function for generating a position registration request containing the assigned care-of address and transmitting the position registration request to the home agent 20 when the radio connecting destination is determined not to be the home network 12.

With this, the care-of address assigned to the mobile terminal 50 is notified to the home agent 20, and then the mobile terminal 50 becomes possible to receive the packet from the partner terminal 60.

Here, an operation of the home agent 20 when receiving the position registration request sent from the mobile terminal 50 as described above will be explained using a flowchart shown in FIG. 6A.

First, the home agent 20 receives the position registration request sent from the mobile terminal 50 via the foreign agent 30B or 30C and stores the position registration request in the binding storing device 23 (step S201). The home agent 20 generates a care-of address table 231 based on the stored position registration request (step S202). Then, the band control device 25 calculates a packet transmission rate based on the care-of address table 231 (step S203).

The packet routing device 24 generates an IP header whose destination address is the care-of address of the care-of address table 231, and performs a process (encapsulation) to add the IP header to the packet stored in the packet storing device 22 (step S204).

The packet routing device 24 transmits the encapsulation processed packet to the care-of address and controls a transmission amount of the packet based on the calculated packet transmission rate (step S205).

Next, an operation of the home agent 20 when receiving the communication band registration request sent from the foreign agent 30B or 30C as described above will be explained using a flowchart shown in FIG. 6B.

First, the home agent 20 receives the communication band registration request sent from the foreign agent 30B or 30C and stores the communication band registration request in the binding storing device 23 (step S211). The home agent 20 updates a value of the care-of address table 231 set in advance, based on the stored communication band registration request (step S212). Then, the band control device 25 calculates and updates a packet transmission rate based on the updated care-of address table 231 (step S213).

The packet routing device 24 generates an IP header whose destination address is the care-of address of the care-of address table 231, and performs a process (encapsulation) to add the IP header to the packet sent from the partner terminal 60 (step S214). The packet routing device 24 transmits the encapsulated packet to the care-of address and controls a transmission amount of the packet based on the updated packet transmission rate (step S215).

With this, the packet can be sent at a transmission rate corresponding to the notified communication band which is used by the mobile terminal 50, and then an overflow of the communication data generated at a radio link whose communication band is limited can be suppressed. Consequently, the data loss and the communication delay can be decreased.

Also, even when some changes occur in the radio communication band used by the mobile terminal 50 due to a state of communication traffic of the network or a radio wave condition, the packet can be transmitted at a transmission rate corresponding to the changed radio communication band.

[Explanation of the Operation of the Fifth Exemplary Embodiment]

Here, an operation of mobile IP control system according to the fifth exemplary embodiment as described above will be explained using a sequence chart shown in FIG. 18.

First, the mobile terminal 50 establishes a radio connection with the access router 40B of the wireless LAN network 14 (step S101). Next, the mobile terminal 50 obtains a care-of address (CoA6) assigned from the foreign agent 30B (step S102), and transmits the position registration request to the home agent 20 (step S103). The foreign agent 30B receives the position registration request sent from the mobile terminal 50 and transmits a Bearer request to the access router 40B (step S104). The access router 40B returns a Bearer response with respect to the Bearer request (step S105). The foreign agent 30B adds Bearer information contained in the received Bearer response to the received position registration request and forwards the position registration request to the home agent 20 (step S106).

The home agent 20 which receives the position registration request returns the position registration response to the mobile terminal 50 (step S107). With this, the packet communication between the home agent 20 and the mobile terminal 50 becomes possible via the foreign agent 30B.

Here, the home agent 20 receives the packet sent from the partner terminal 60 to the mobile terminal 50 (step S108). The home agent 20 forwards the received packet to the mobile terminal 50 by operating in such a manner as shown in FIG. 6A (step S109).

The foreign agent 30B which receives the forwarded packet performs decapsulation processing to the packet and forwards the packet to the mobile terminal 50 (step S110).

Here, the mobile terminal 50 establishes a radio connection with the radio base station 40C by relocating into the foreign network 151 of the WiMAX network 15 (step S111). Next, the mobile terminal 50 obtains a care-of address (CoA7) assigned from the foreign agent 30C (step S112), and transmits the position registration request to the home agent 20 (step S113). The foreign agent 30C receives the position registration request and transmits a Bearer request to the radio base station 40C (step S114). The radio base station 40C returns a Bearer response with respect to the Bearer request (step S115). The foreign agent 30C adds Bearer information contained in the received Bearer response to the received position registration request and forwards the position registration request to the home agent 20 (step S116).

The home agent 20 which receives the position registration request returns the position registration response to the mobile terminal 50 (step S117). With this, the packet communication between the home agent 20 and the mobile terminal 50 becomes possible via the foreign agent 30C.

Here, the home agent 20 forwards the packet sent from the partner terminal 60 to the mobile terminal 50 by operating in such a manner as shown in FIG. 6A, as described in step 109 (step S118).

The foreign agent 30C which receives the forwarded packet performs decapsulation-processing to the packet and forwards the packet to the mobile terminal 50 (step S119).

As described above, in the fifth exemplary embodiment, when performing a handover for switching the connecting destination of the mobile terminal 50 from the wireless LAN network 14 to the WiMAX network 15 while maintaining the radio communication state, the transmission speed of the packet forwarded from the home agent 20 to the mobile terminal 50 is controlled according to the radio communication band used by the mobile terminal 50. With this, even if the communication band is changed due to the handover, the shortage in communication capacity and the generation of the overflow of the communication data can be suppressed.

Also, in the fifth exemplary embodiment, the WiMAX network 15 and the wireless LAN network 14 are set as the connecting destination for the mobile terminal 50. However, even when the mobile terminal 50 roams between any of the mobile phone network 13, the WiMAX network 14, the wireless LAN network 15, and VPN network 16, which are differ from each other in radio communication band, it is possible to control the packet transmission amount and the transmission speed effectively corresponding to the communication band of the connecting destination, and the handover can be performed smoothly as in the case of this exemplary embodiment.

Further, since the transmission speed of the packet forwarded from the home agent 20 to the mobile terminal 50 can be maintained constantly, the load on the radio base station and the access router which perform the communication relay processing can be reduced.

While the invention has been described with reference to exemplary embodiments (and examples) thereof, the invention is not limited to these embodiments (and examples). Various changes in form and details which are understood by those skilled in the art may be made within the scope of the present invention.

INDUSTRIAL APPLICABILITY

The present invention can be applied to a service for distributing audio and video to a mobile device such as a PDA.

BRIEF DESCRIPTION OF THE DRAWINGS

FIG. 3 is an explanatory diagram showing an example of a foreign table stored in the home agent in the mobile IP control system disclosed in FIG. 1;

FIGS. 5A and 5B show the mobile IP control system disclosed in FIG. 1: FIG. 5A is an explanatory diagram showing an example of a communication band storing table to which Bearer information of a radio communication used by the mobile terminal is stored, and FIG. 5B is an explanatory diagram showing an outline of a content of the Bearer information sent from the foreign agent to the home agent;

FIG. 6A is a flowchart schematically showing steps processed when the home agent receives a position registration request, and FIG. 6B is a flowchart schematically showing steps processed when the home agent receives a communication band registration request;

REFERENCE NUMERALS

Figure 1:
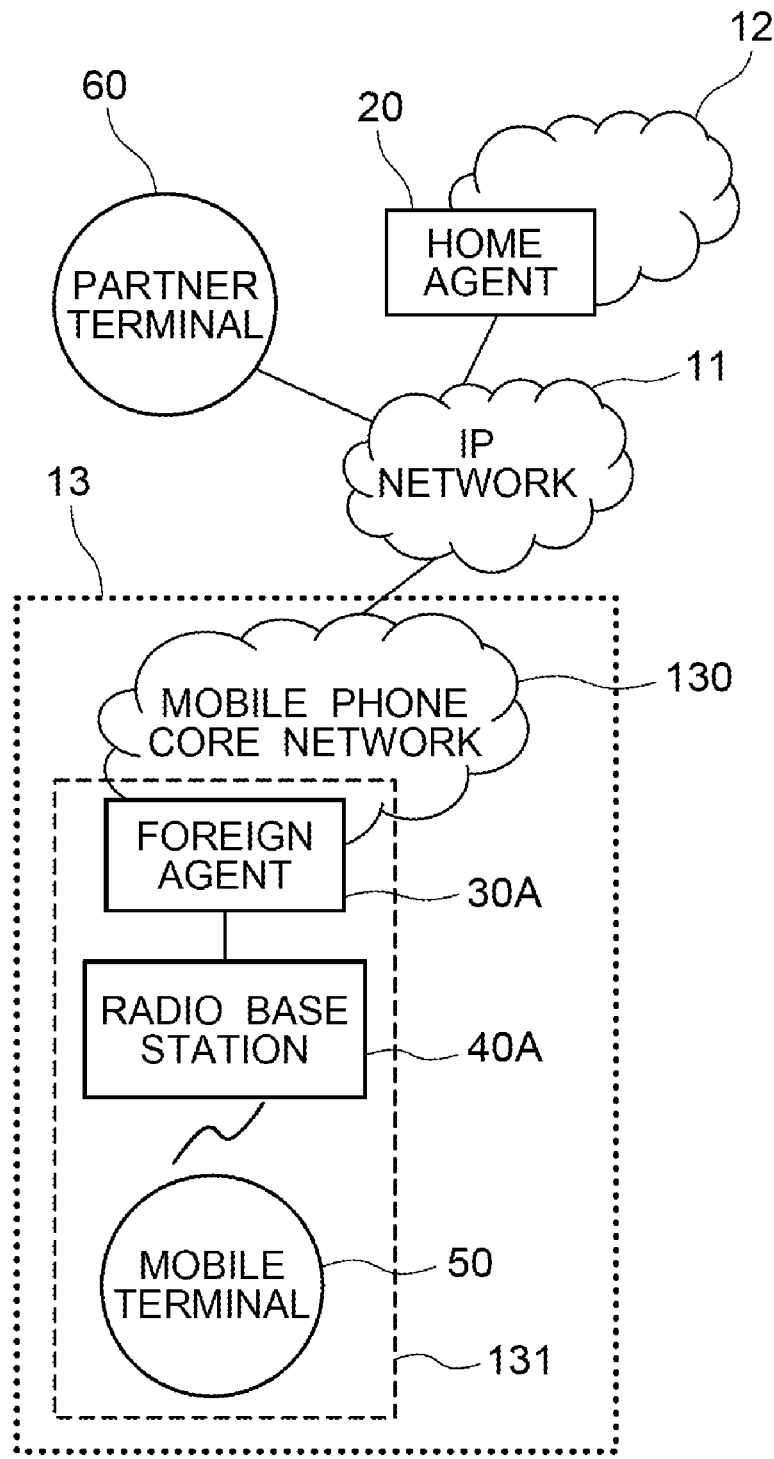
FIG. 1 is a schematic diagram showing an entire network in a first exemplary embodiment of a mobile IP control system according to the present invention.
Figure 2:
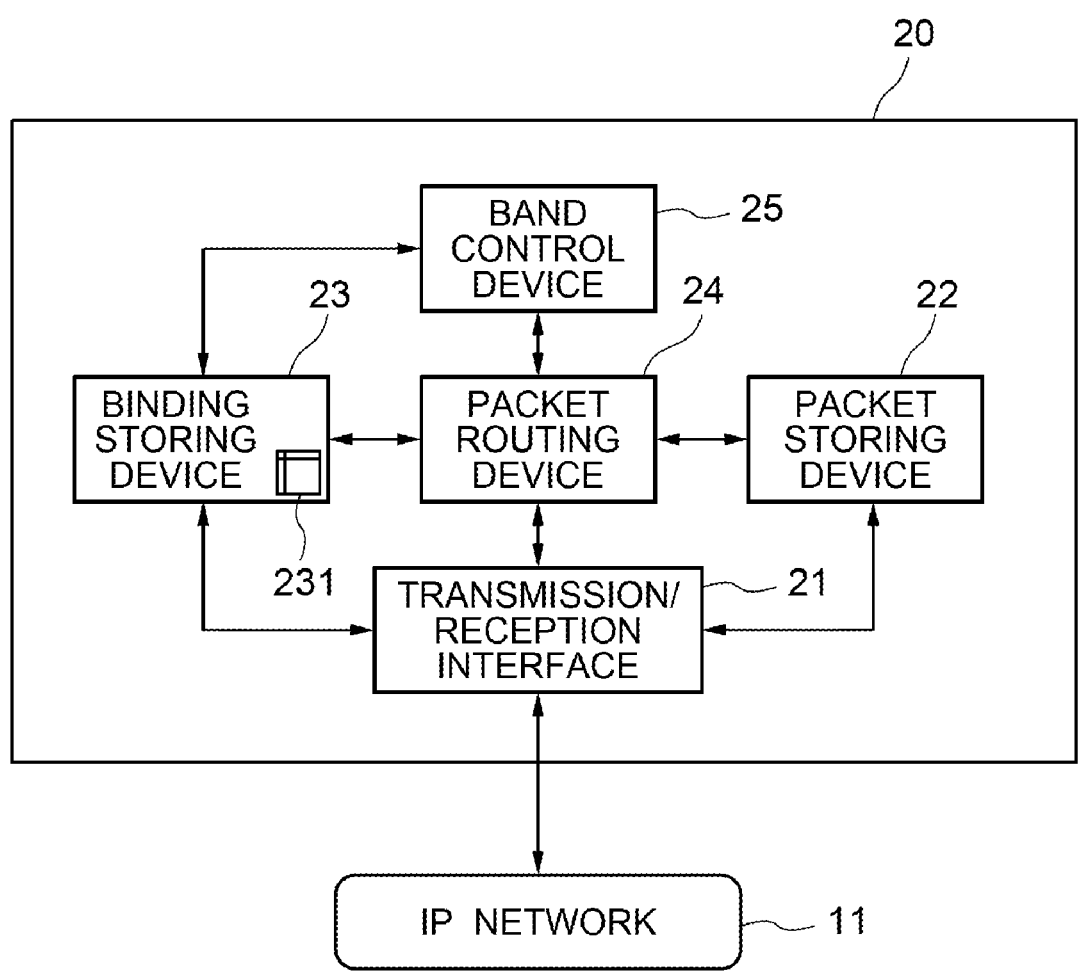
FIG. 2 is a block diagram showing a specific example of a home agent in the mobile IP control system disclosed in FIG. 1.
Figure 4:
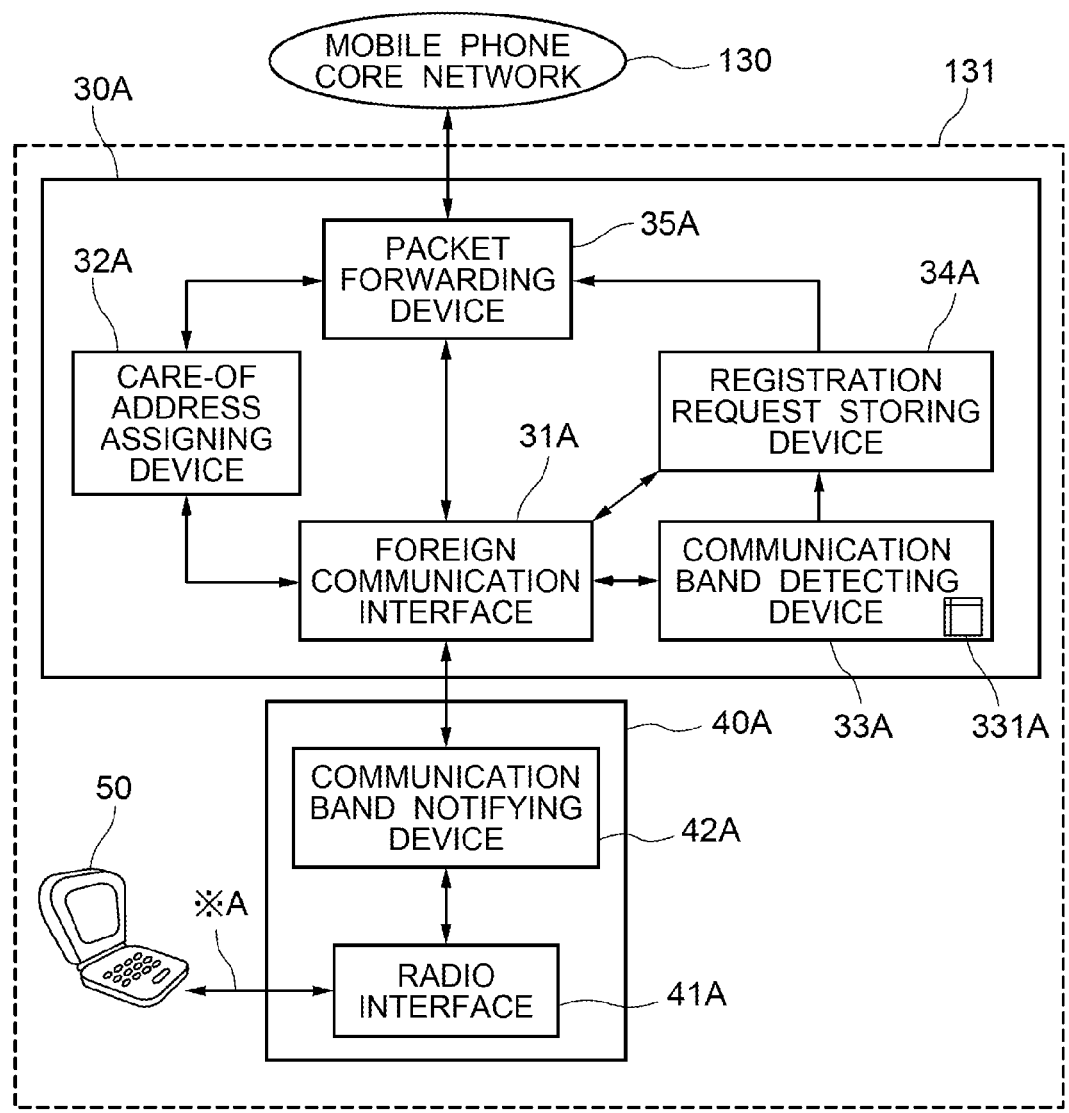
FIG. 4 is a block diagram showing an example of configurations of a foreign agent and a radio base station in the mobile IP control system disclosed in FIG. 1.
Figure 6A:
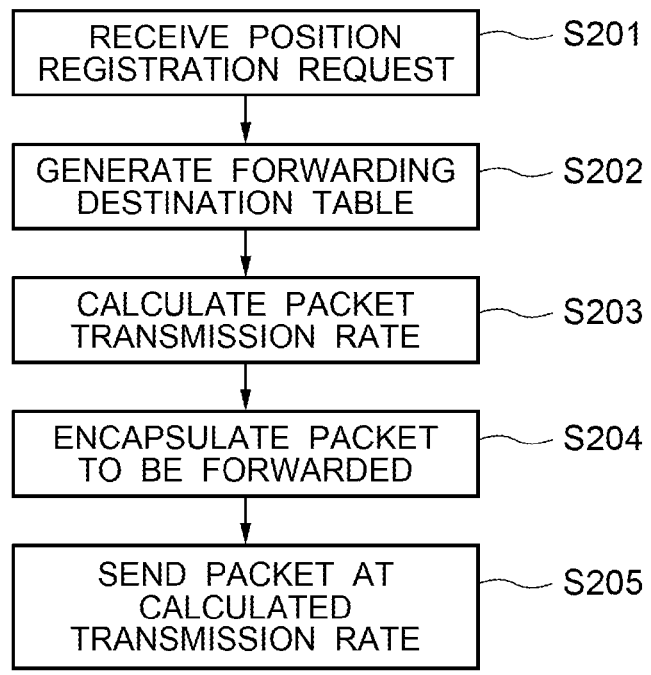
FIGS. 6A and 6B show the mobile IP control system disclosed in FIG. 1.
Figure 6B:
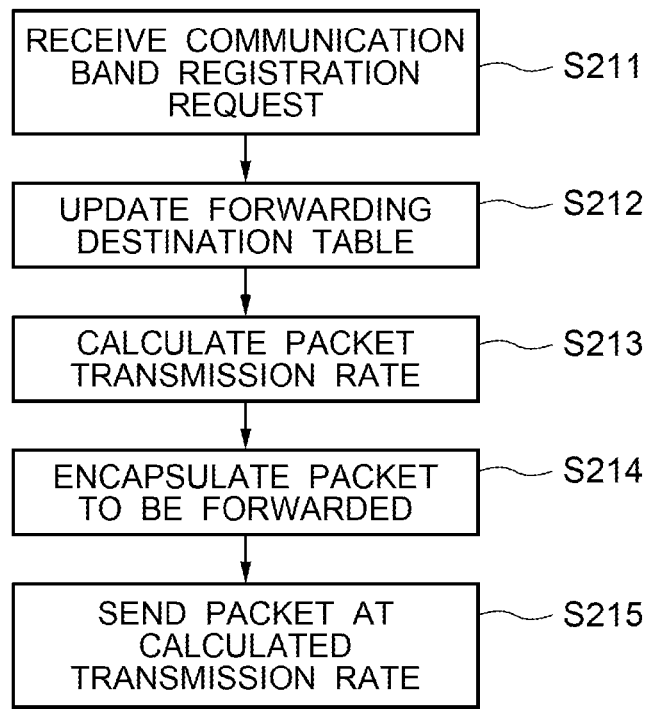
Figure 7:
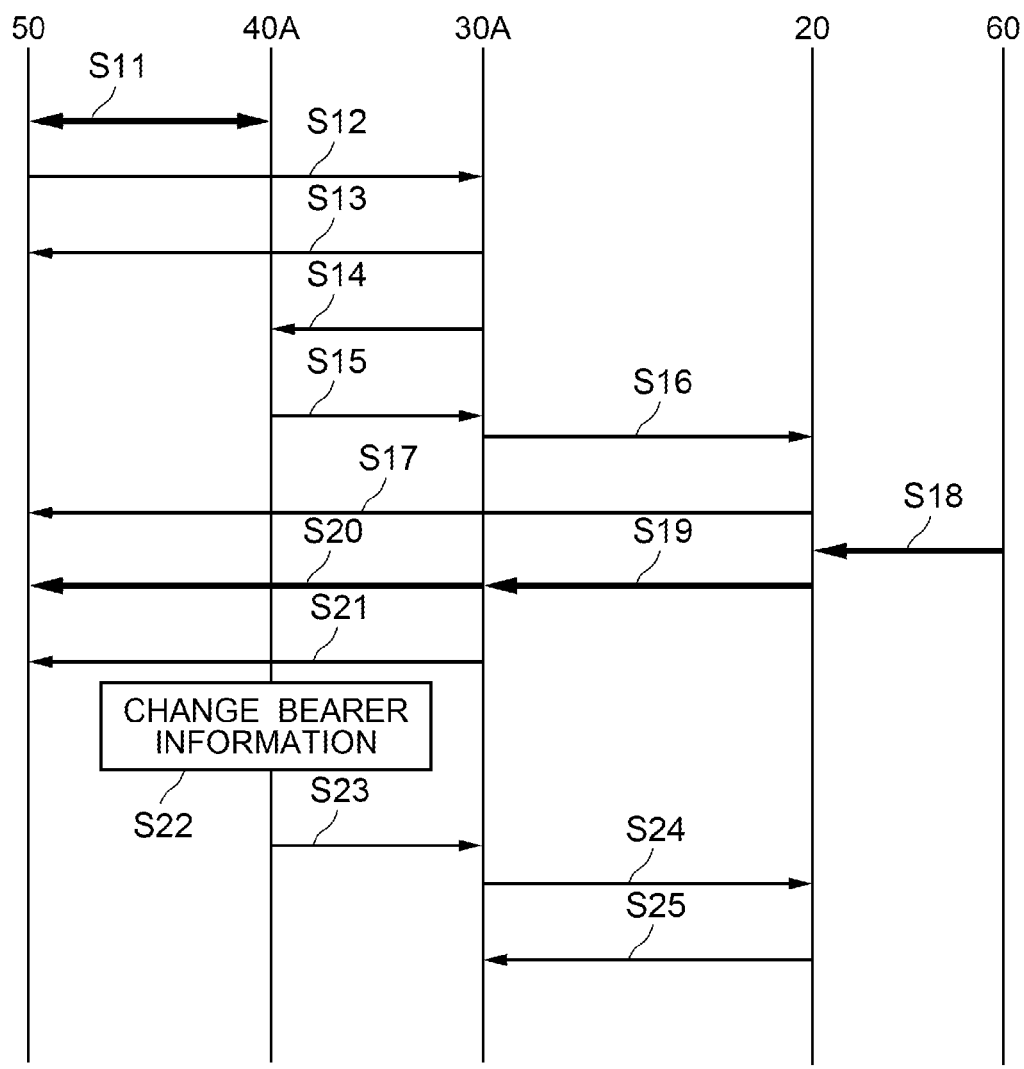
FIG. 7 is a communication sequence chart showing timings of communication operations mutually performed between the mobile terminal, the radio base station, the foreign agent, the home agent, and the partner terminal in the mobile IP control system disclosed in FIG. 1.
Figure 8:
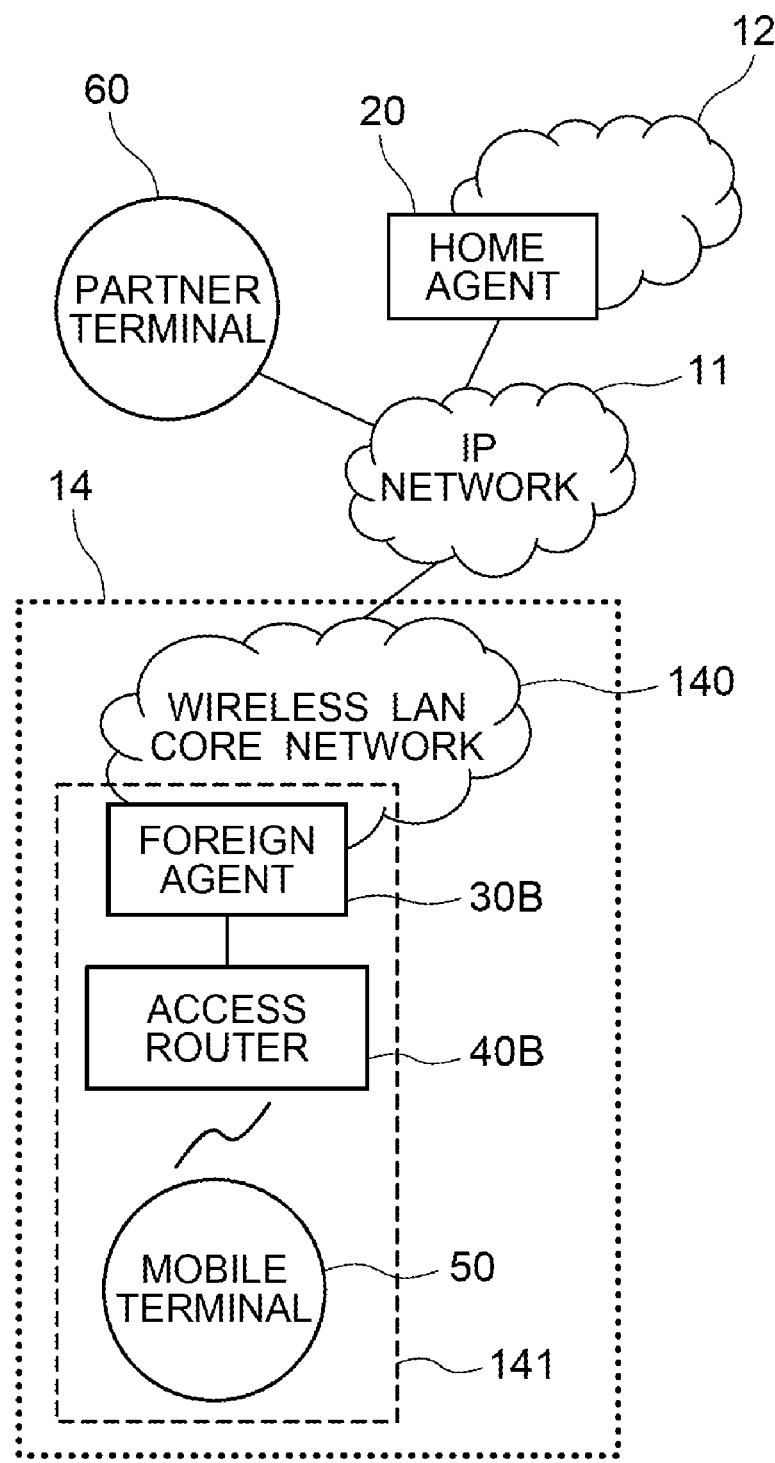
FIG. 8 is a schematic diagram showing an entire network in a second exemplary embodiment of the mobile IP control system according to the present invention.
Figure 9:
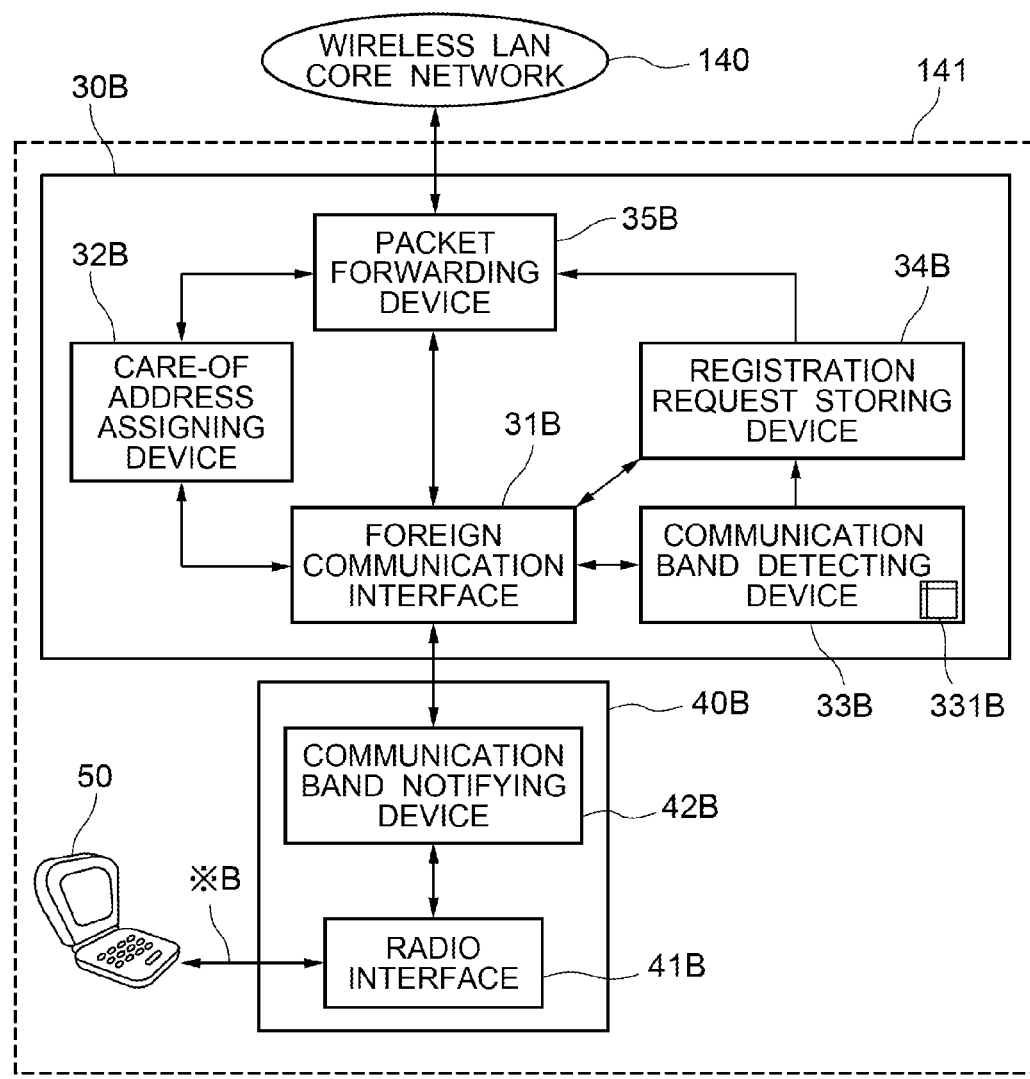
FIG. 9 is a block diagram showing an example of configurations of a foreign agent and an access router in the second exemplary embodiment of the mobile IP control system disclosed in FIG. 8.
Figure 10:
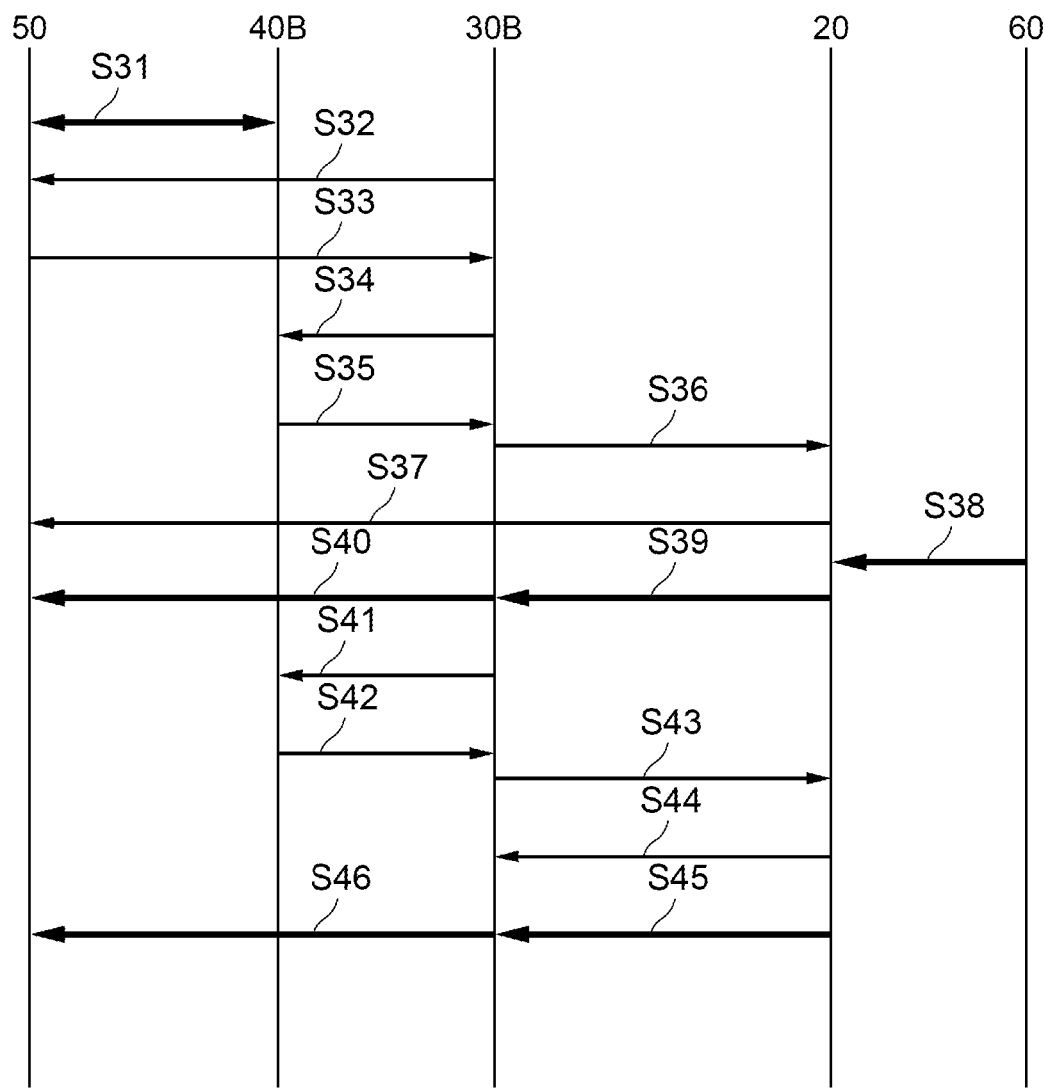
FIG. 10 is a communication sequence chart showing timings of communication operations mutually performed between the mobile terminal, the access router, the foreign agent, the home agent, and the partner terminal in the second exemplary embodiment of the mobile IP control system disclosed in FIG. 8.
Figure 11:
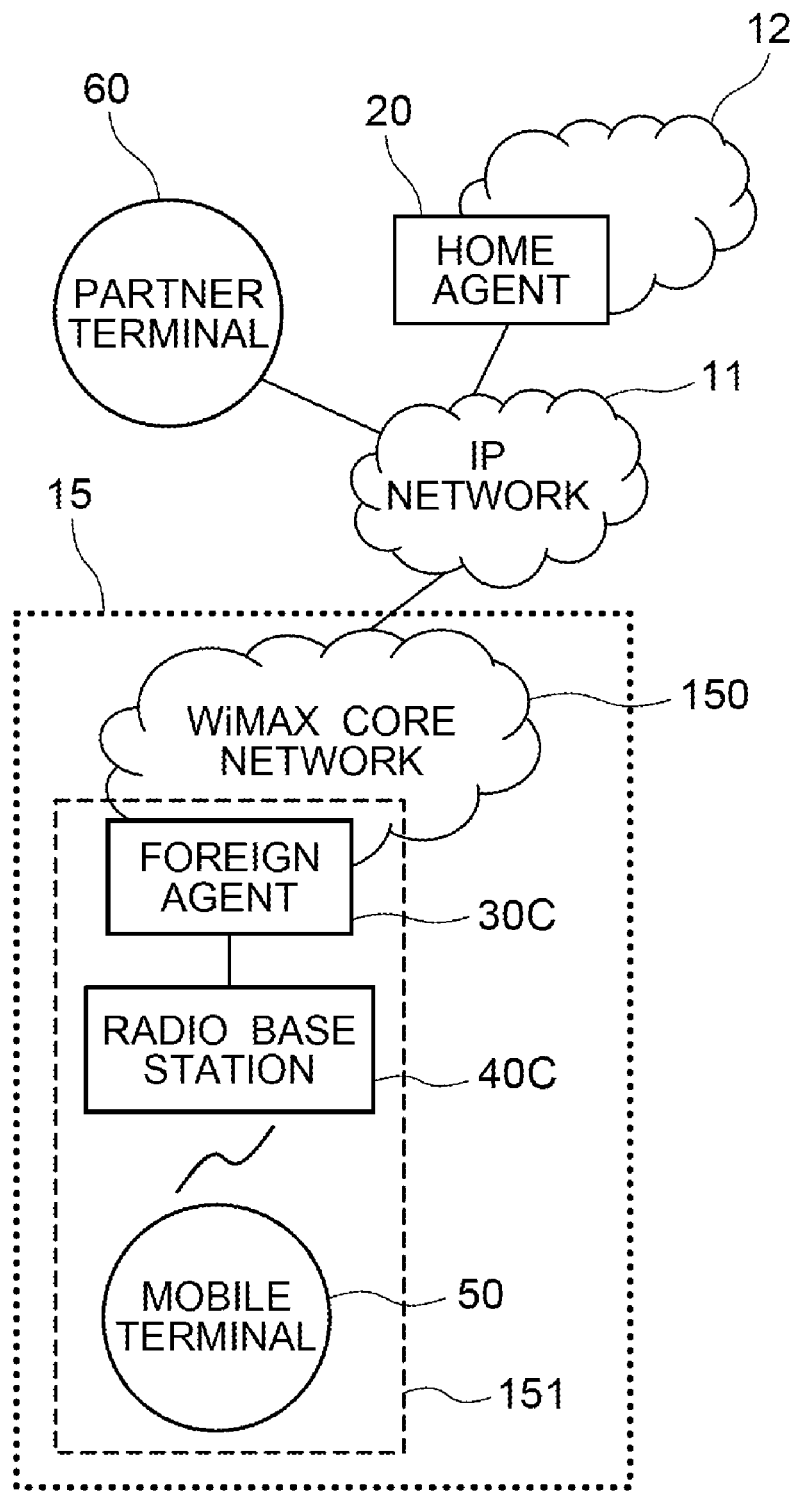
FIG. 11 is a schematic diagram showing an entire network in a third exemplary embodiment of the mobile IP control system according to the present invention.
Figure 12:
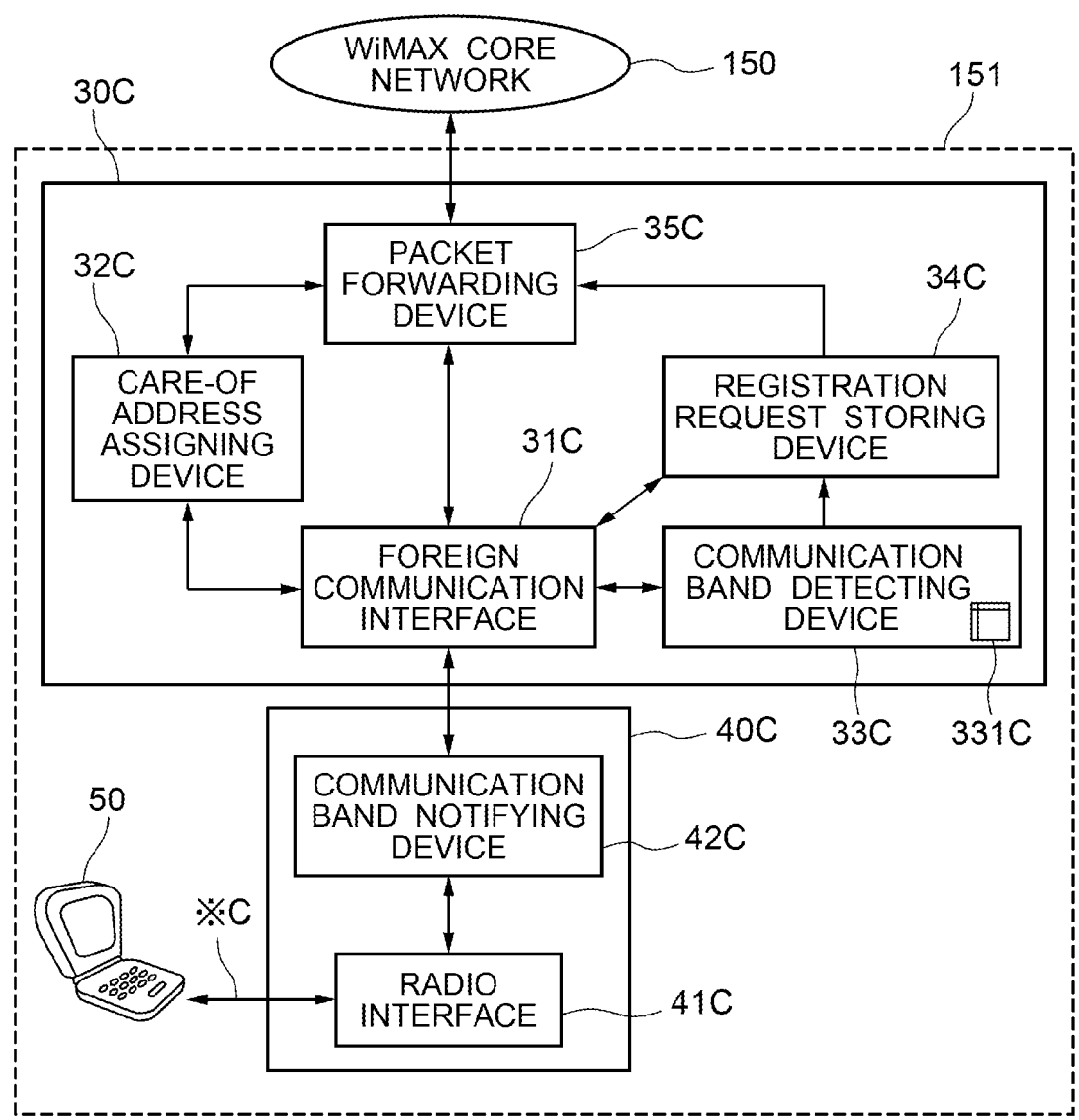
FIG. 12 is a block diagram showing an example of configurations of a foreign agent and a radio base station in the third exemplary embodiment of the mobile IP control system disclosed in FIG. 11.
Figure 13:
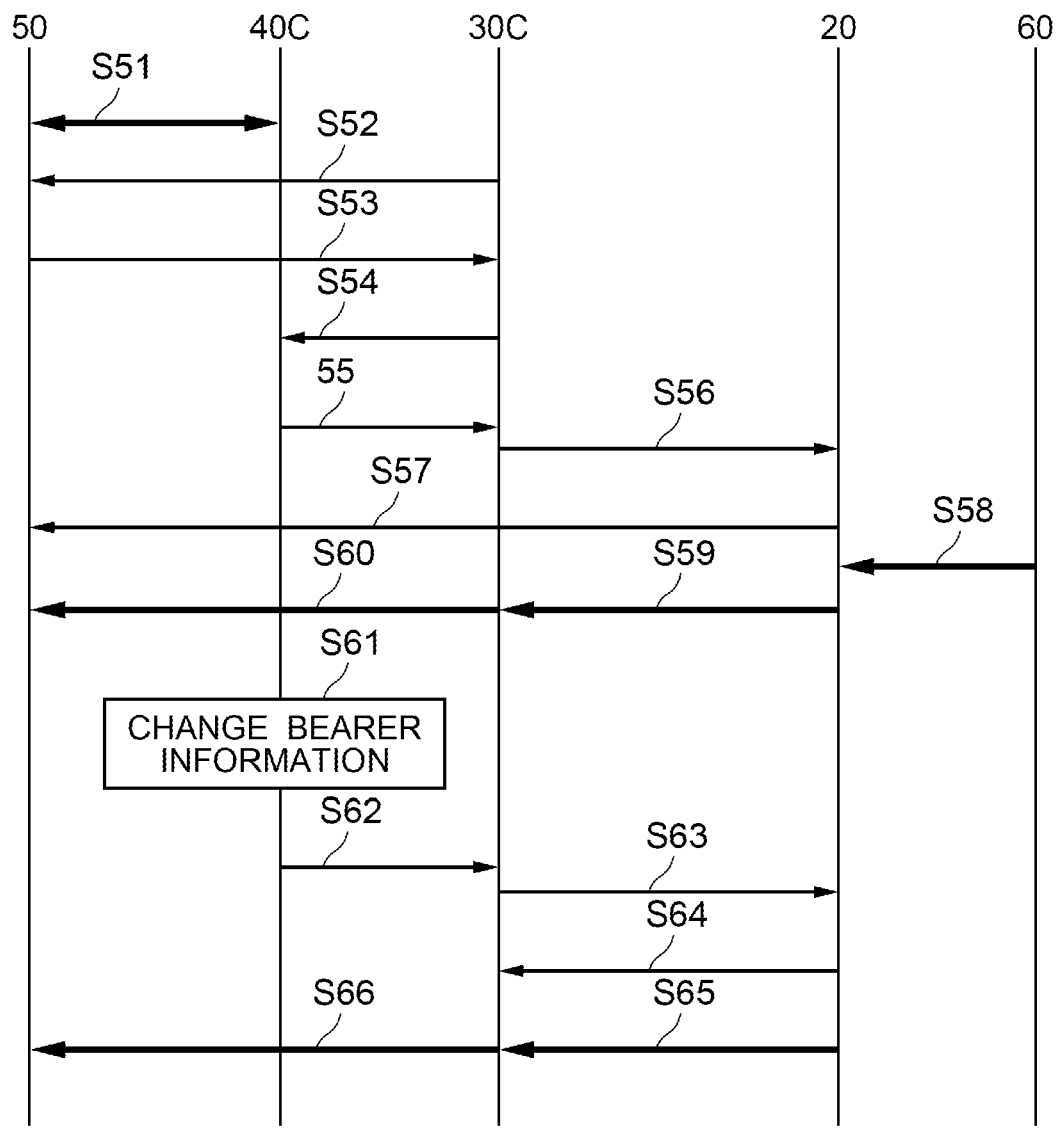
FIG. 13 is a communication sequence chart showing timings of communication operations mutually performed between the mobile terminal, the radio base station, the foreign agent, the home agent, and the partner terminal in the third exemplary embodiment of the mobile IP control system disclosed in FIG. 11.
Figure 14:
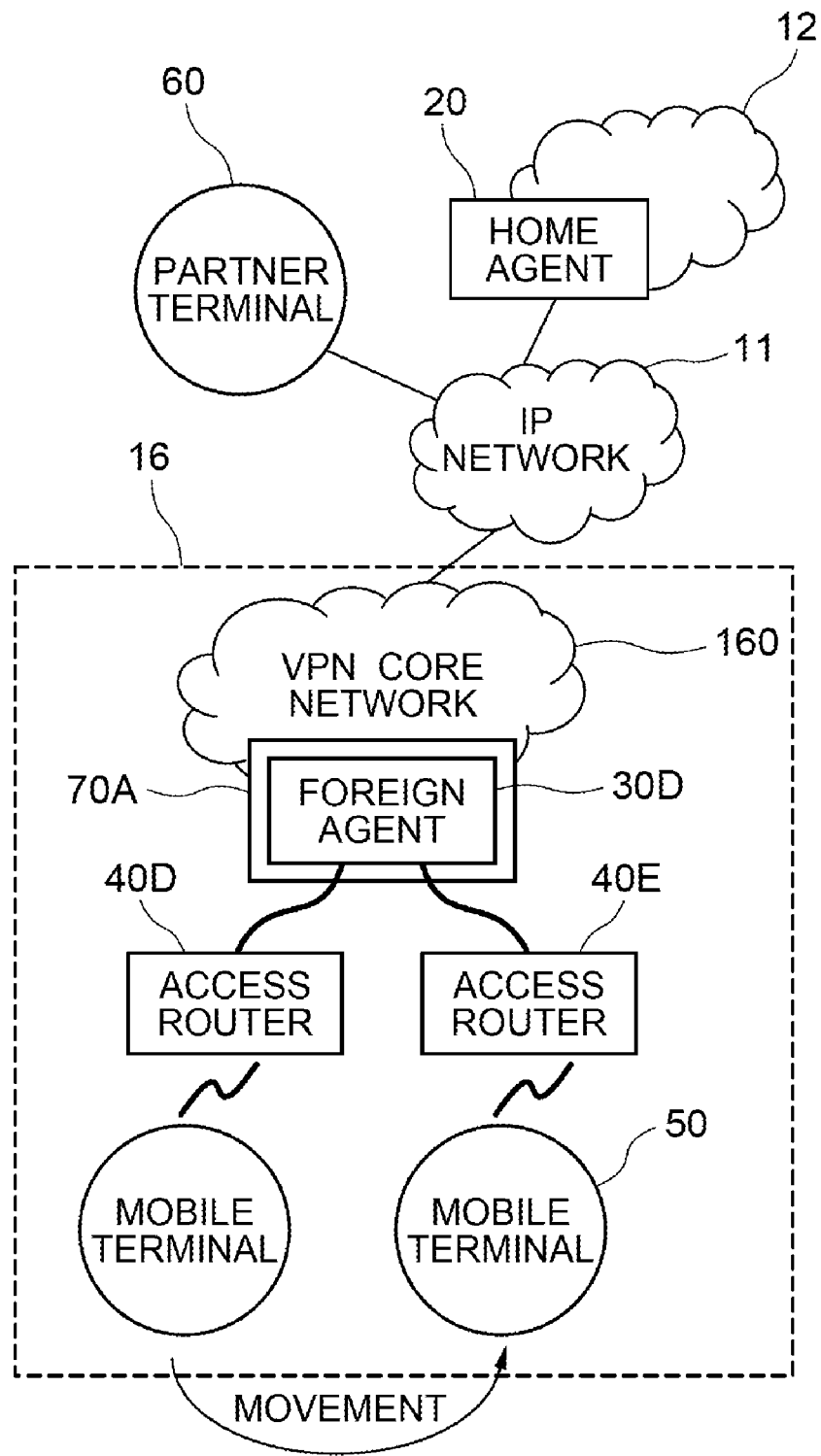
FIG. 14 is a schematic diagram showing an entire network in a fourth exemplary embodiment of the mobile IP control system according to the present invention.
Figure 15:
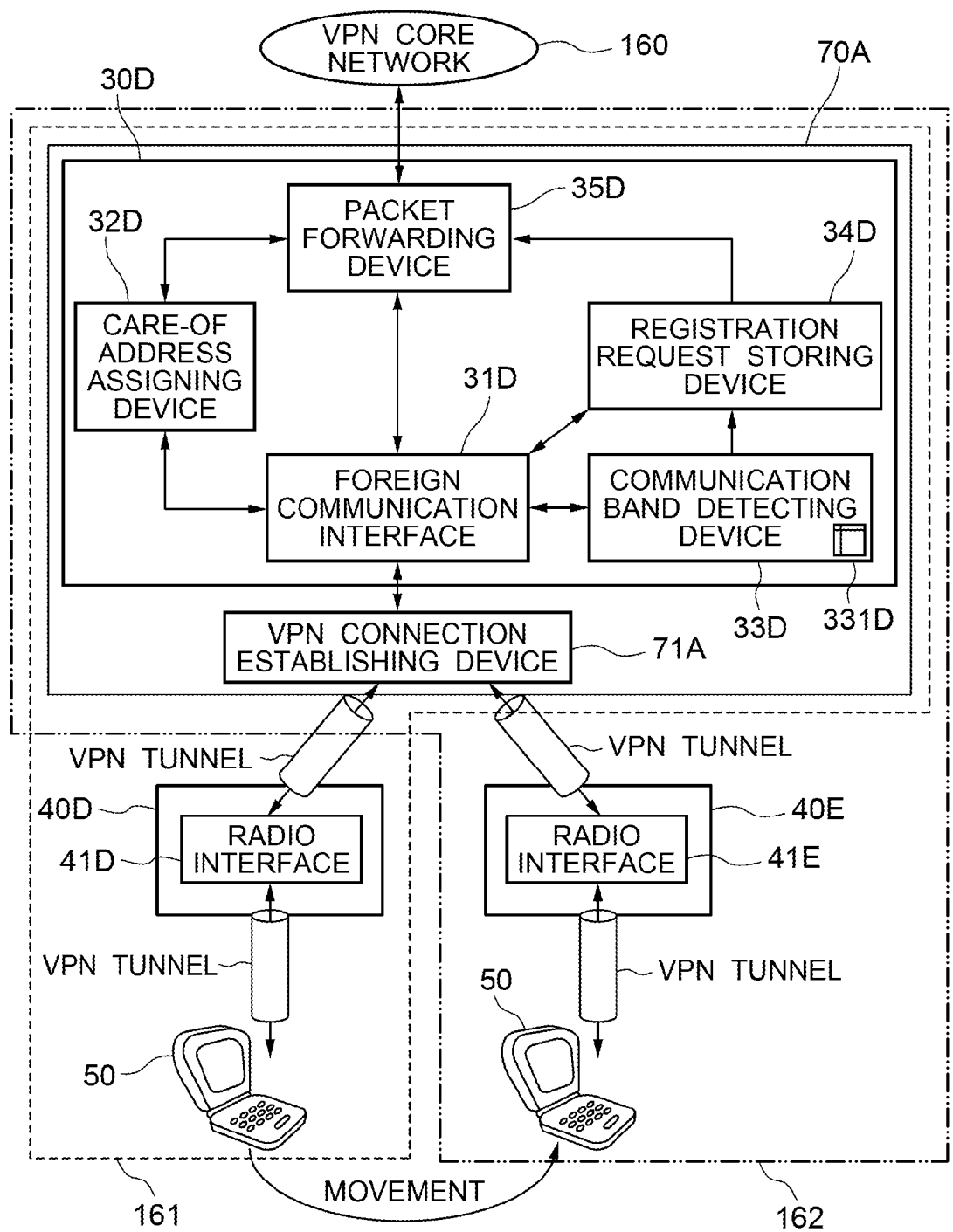
FIG. 15 is a block diagram showing an example of configurations of a foreign agent and an access router in the fourth exemplary embodiment of the mobile IP control system disclosed in FIG. 14.
Figure 16:
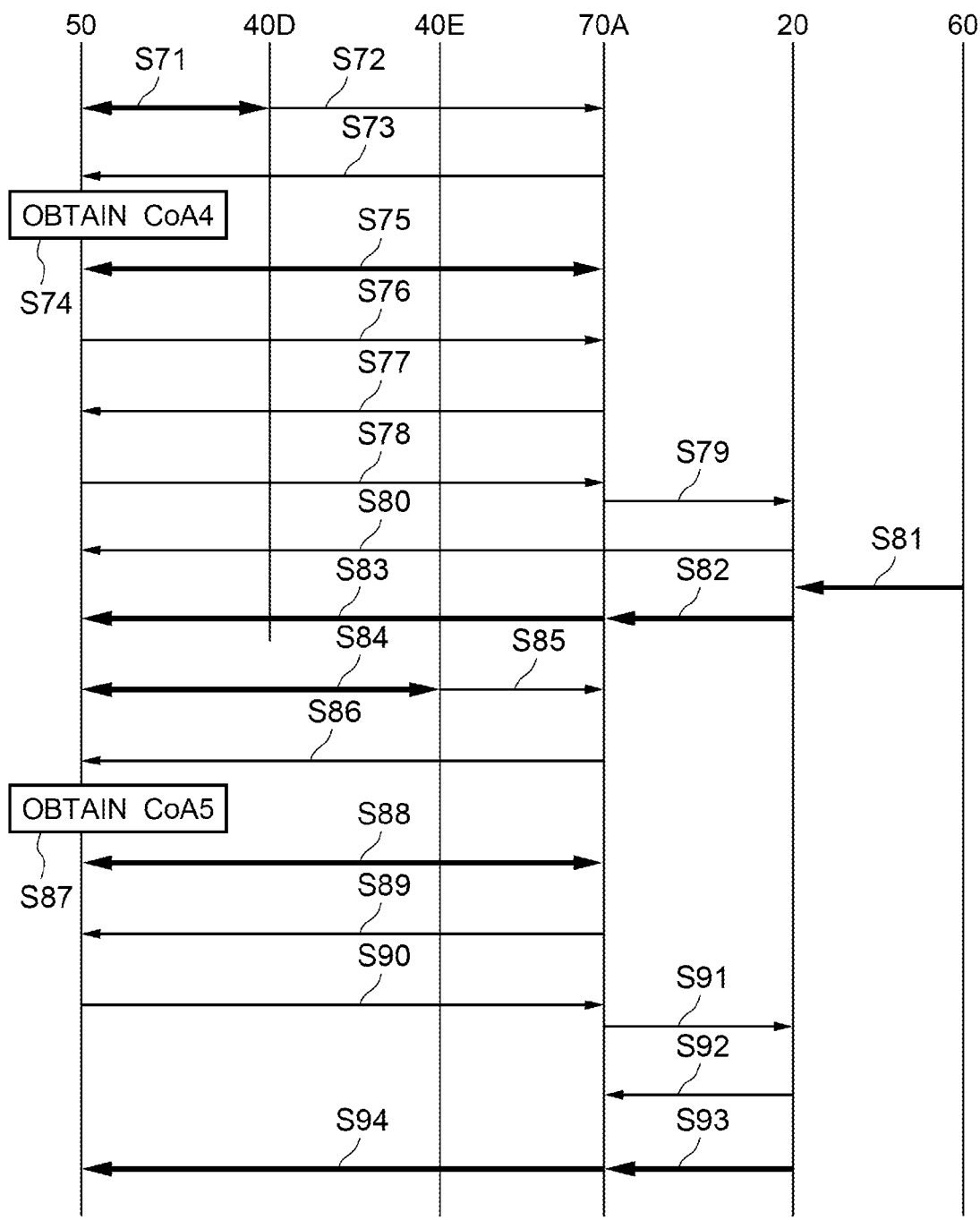
FIG. 16 is a communication sequence chart showing timings of communication operations mutually performed between the mobile terminal, the access router, the foreign agent, the home agent, and the partner terminal in the fourth exemplary embodiment of the mobile IP control system disclosed in FIG. 14.
Figure 17:
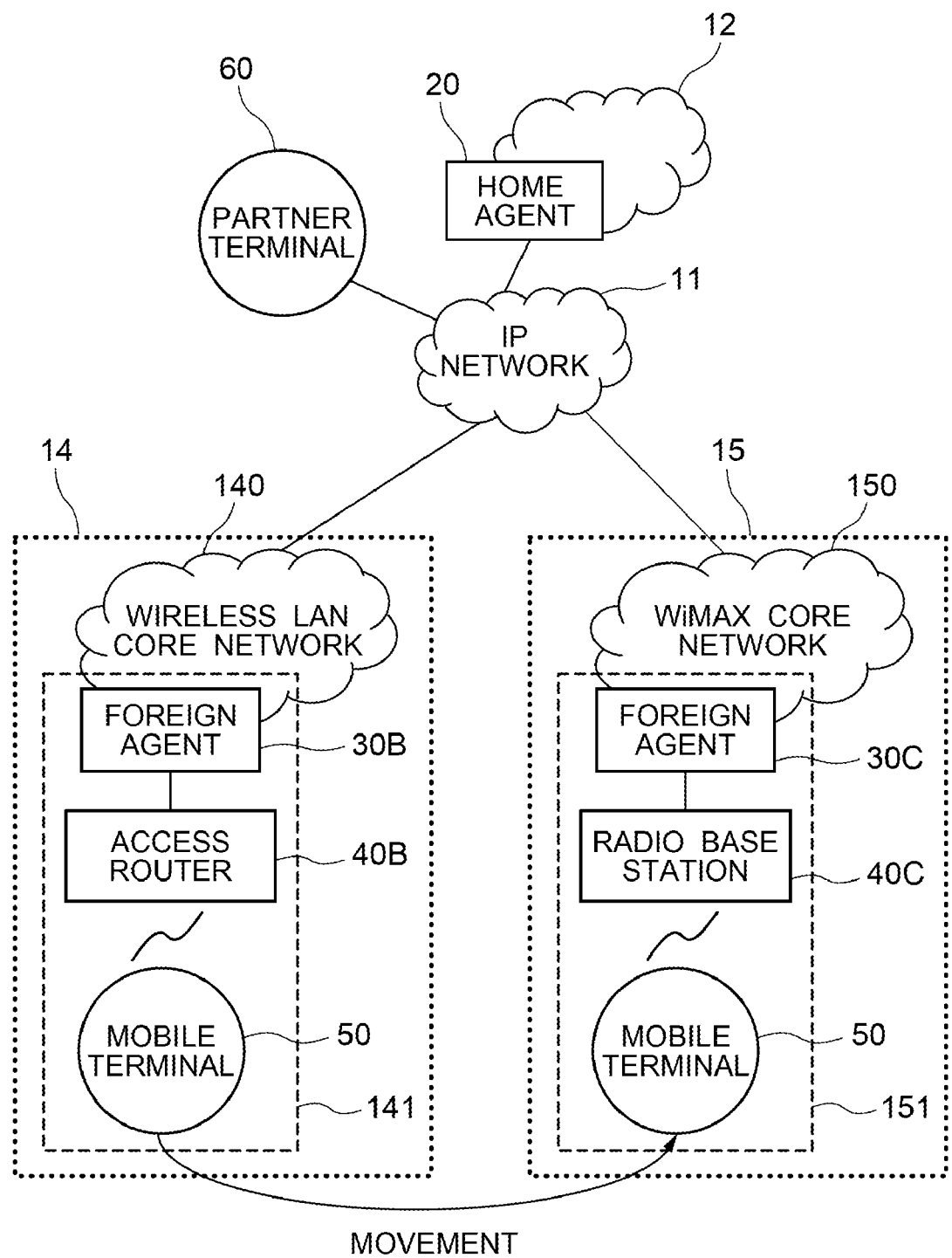
FIG. 17 is a schematic diagram showing an entire network in a fifth exemplary embodiment of the mobile IP control system according to the present invention.
Figure 18:
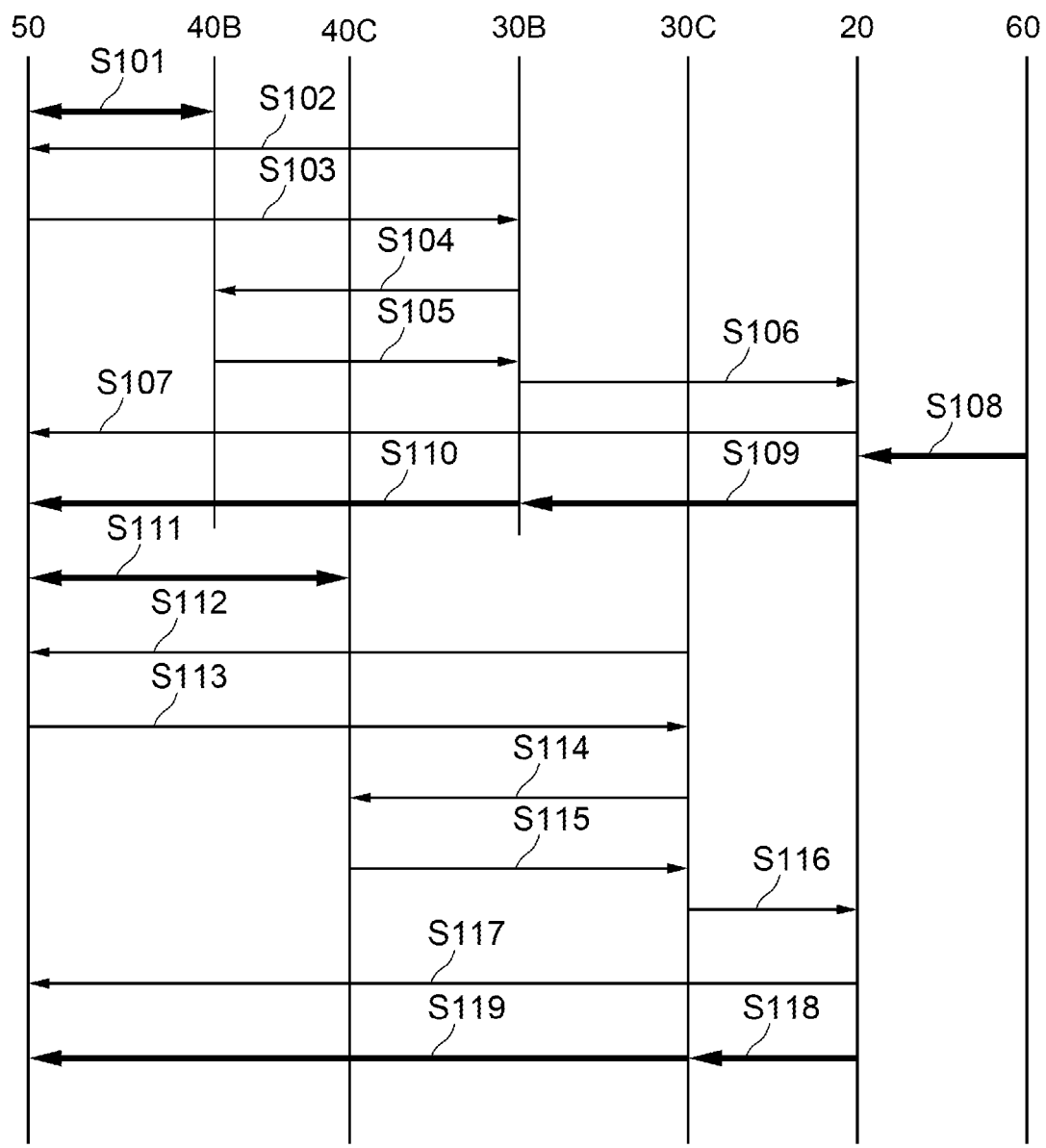
FIG. 18 is a communication sequence chart showing timings of communication operations mutually performed between the mobile terminal, the radio base station, the access router, the foreign agent, the home agent, and the partner terminal in the fifth exemplary embodiment of the mobile IP control system disclosed in FIG. 17.
Figure 19:
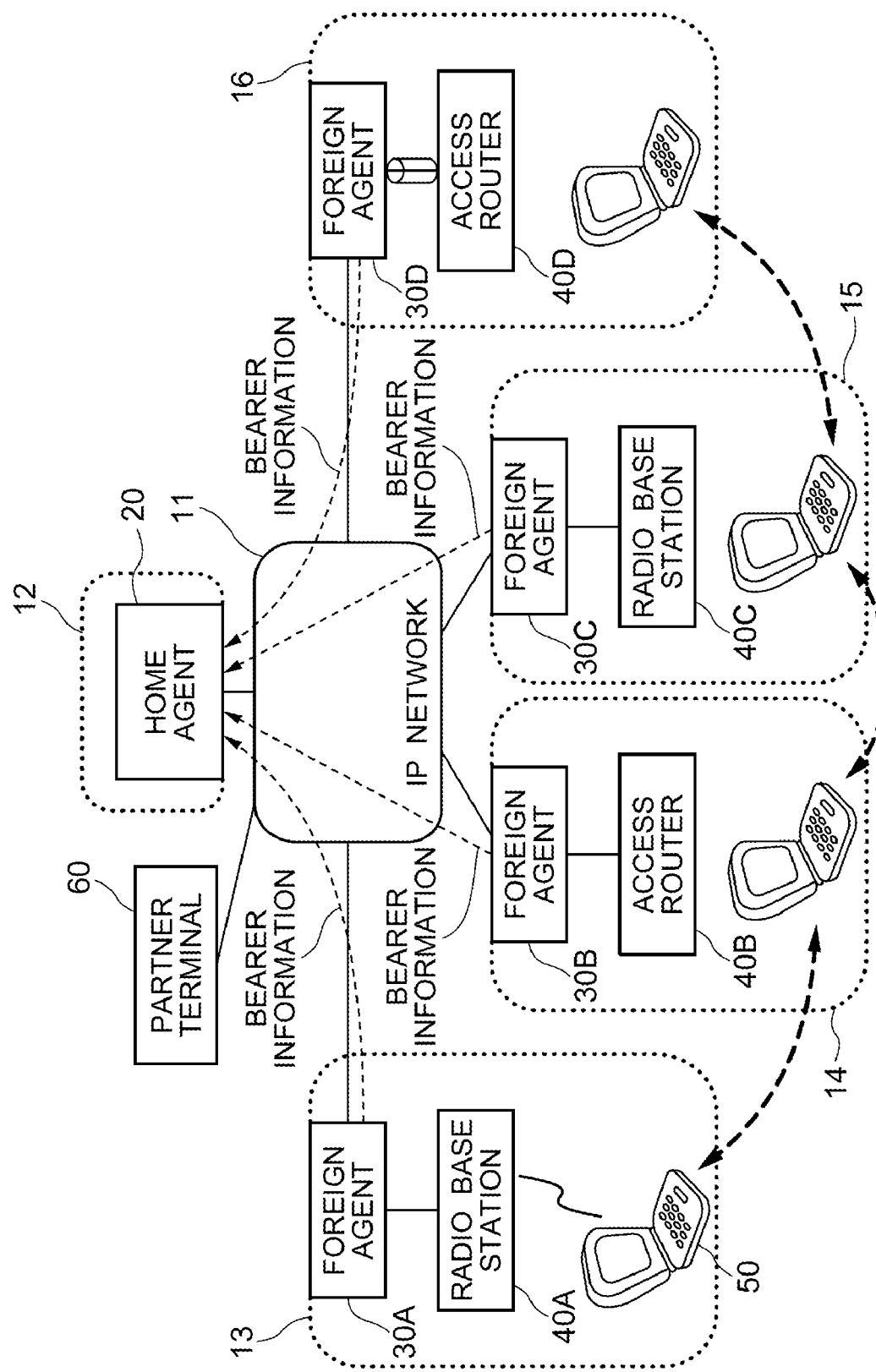
FIG. 19 is a schematic diagram showing an entire network in a mobile IP control system according to the present invention.
Figure 20:
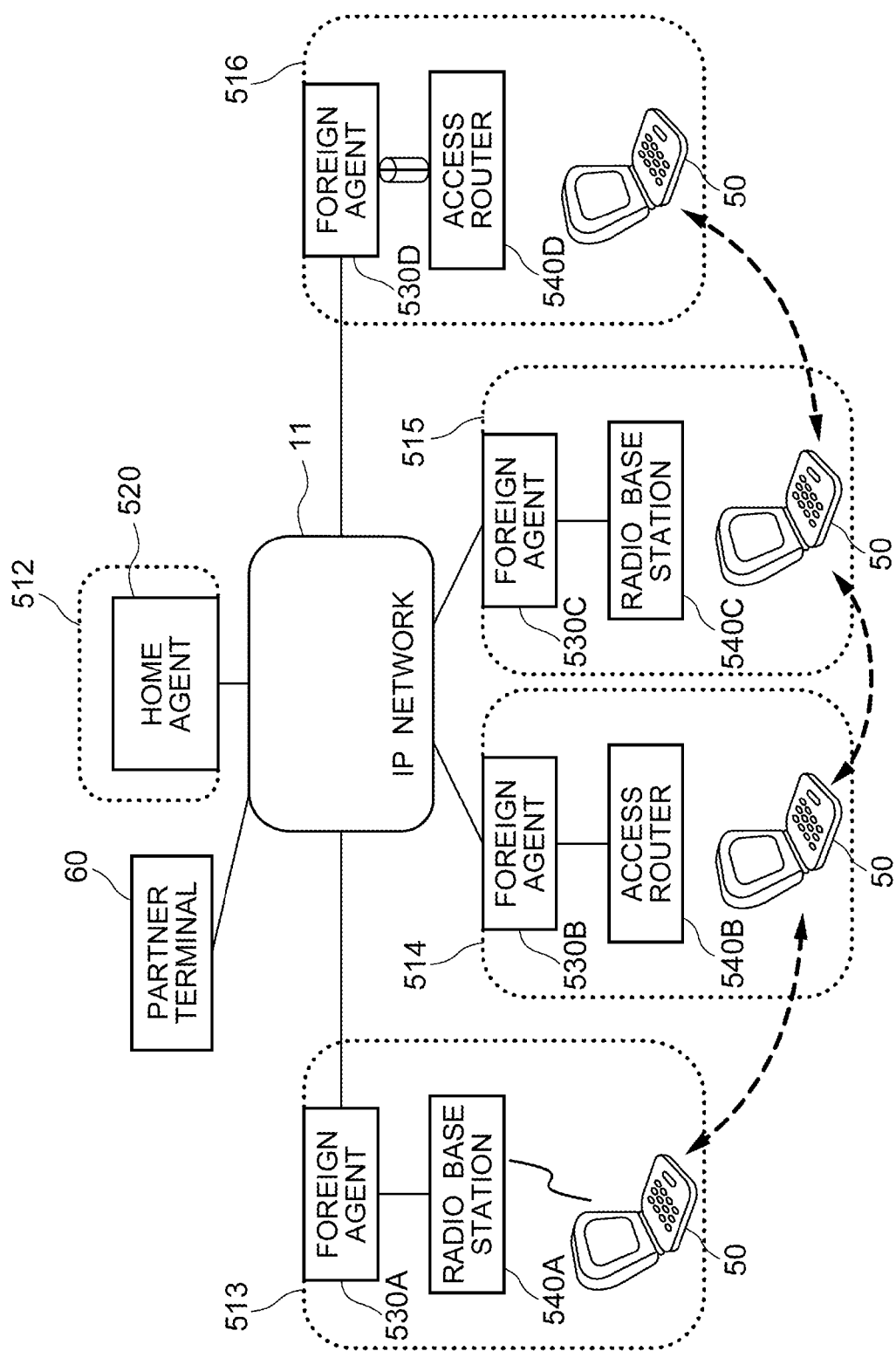
FIG. 20 is a schematic diagram showing an entire network in a mobile IP control system according to a traditional example.

11 IP network
12,512 Home network
13,513 Mobile phone network
14,514 Wireless LAN network
15,515 WiMAX network
16,516 VPN network
20,520 Home agent
21 Transmission/reception interface
22 Packet storing device
23 Binding storing device
24 Packet routing device
25 Band control device
30A,30B,30C,30D,530A,530B,530C,530D Foreign agent
31A,31B,31C,31D Foreign communication interface
32A,32B,32C,32D Care-of address assigning device
33A,33B,33C,33D Communication band detecting device
34A,34B,34C,34D Registration request storing device
35A,35B,35C,35D Packet forwarding device
40A,40C,540A,540C Radio base station
40B,40D,40E,540B,540D Access router
41A,41B,41C,41D Radio interface
42A,42B,42C,42D Communication band notifying device
50 Mobile terminal
60 Partner terminal
70A VPN gateway
71A VPN connection establishing device
130 Mobile phone core network
140 Wireless LAN core network
150 WiMAX core network
160 VPN core network
131,141,151,161,162 Foreign network
231 Forwarding destination table
331A,331B,331C,331D Communication band storing table
*A,*B,*C,*D Radio communication

What is claimed is:

1. A mobile IP control system comprising one or a plurality of radio relay devices for presenting a radio connection link to a mobile terminal and a home agent for communicating with the mobile terminal via each of the radio relay devices, wherein the mobile terminal and a partner terminal set in advance communicate mutually via the home agent,
and further comprising a foreign agent for managing a position registration processing of the mobile terminal, wherein the foreign agent manages the position registration processing by adding a Bearer type which is used for mutual radio communication performed between the radio relay device and the mobile terminal to a position registration request.

2. The mobile IP control system as claimed in claim 1, wherein the home agent manages the Bearer type of the mobile terminal contained in the position registration request by a binding storing device.

3. The mobile IP control system as claimed in claim 2, wherein the home agent comprises:
an address engaging/storing device which stores a foreign address of the mobile terminal at a visited location and a unique address set in advance to the mobile terminal; a packet forwarding device which forwards packet information, sent from the partner terminal to the unique address, to the mobile terminal based on the foreign address; and a transmission rate control device which controls a packet transmission rate at a time when the packet forwarding device forwards the packet information, based on the notified communication band value.

4. The mobile IP control system as claimed in claim 2, wherein the mobile terminal has a foreign address notification function for notifying the home agent of a foreign address which is assigned to the mobile terminal when the mobile terminal wirelessly connects to each of the radio relay devices in visited location, and the foreign agent has an address and band engaging/forwarding function for forwarding the notified foreign address and the detected communication band so as to be engaged with each other, to the home agent.

5. The mobile IP control system as claimed in claim 2, wherein each of the foreign agents has a communication band detecting function for detecting a communication band of a mutual radio communication performed between the radio relay device, provided to the foreign agent, and the mobile terminal, and a communication band update notifying function for notifying the home agent of a value of newly detected communication band when a change in the communication band is detected.

6. The mobile IP control system as claimed in claim 2, wherein the mobile terminal comprises a radio connection selecting device which operates based on the intensity of radio wave received from each of the plurality of radio relay devices which are different in radio type and establishes a radio connection with a radio relay device from which the radio wave having the highest intensity is received among the plurality of radio relay devices.

7. The mobile IP control system as claimed in claim 2, wherein the mobile terminal comprises a radio connection selecting device which operates based on the intensity of the radio wave received from each of the plurality of radio relay devices which are same in radio type and establishes a radio connection with a radio relay device from which the radio wave having the highest intensity is received among the plurality of radio relay devices.

8. The mobile IP control system as claimed in claim 2, wherein the foreign agent comprises a communication band calculating device which transmits a response request to the mobile terminal when the communication band of the mutual radio communication performed between the radio relay device and the mobile terminal is not able to be detected, and calculates a communication band used by the mobile terminal based on the time period from the response request to a response.

9. The mobile IP control system as claimed in claim 1, wherein the radio relay device is a radio base station.

10. A home agent which performs a communication with a mobile terminal via one or a plurality of radio relay devices presenting a radio connection link to the mobile terminal, comprising a binding storing device for managing a Bearer type used for mutual radio communication performed between the radio relay device and the mobile terminal, contained in a position registration request managed by a foreign agent for performing a position registration processing of the mobile terminal.

11. The home agent as claimed in claim 10, wherein the radio relay device is a radio base station.

12. A method of controlling a mobile IP with which a mobile terminal and a partner terminal communicates via a home agent which manages a foreign address of the mobile terminal, including:

a radio connection establishment step in which the mobile terminal establishes a radio connection at a visited location and a foreign address is assigned to the mobile terminal;

a communication band detection step of detecting a value of the communication band of the established radio connection;

a foreign address notification step of notifying the home agent of the value of the detected communication band and the foreign address; and a transmission rate control step of controlling a packet transmission rate based on the notified value of the communication band when the home agent forwards a packet received from the partner terminal to the notified foreign address.

13. The method of controlling the mobile IP as claimed in claim 12, including, prior to the transmission rate control step, a communication band value notification step of, when the value of the communication band of the established radio communication is changed, notifying the home agent of a value of newly detected communication band.

14. The method of controlling the mobile IP as claimed in claim 12, wherein a radio base station is used for a radio relay device for presenting a radio connection link to the mobile terminal.

15. A non-transitory computer readable recording medium storing a mobile IP control program for controlling a mutual communication performed between a mobile terminal and a partner terminal via a home agent which manages a foreign address of the mobile terminal, the program causing a computer to execute:

an address and band corresponding/storing function for storing a communication band of the radio communication performed by the mobile terminal at a visited location, the foreign address, and a unique address assigned to the mobile terminal in advance, in such a manner as corresponding with each other; and a transmission rate control function for controlling a packet transmission rate when forwarding the packet which is received from the partner terminal to the mobile terminal based on the stored communication band.

16. A non-transitory computer readable recording medium storing a mobile IP control program with which a home agent that relays a mutual communication between a mobile terminal and a partner terminal performs a band control in the mutual communication, the program causing a computer to execute:

a communication band detecting function for detecting a communication band of a mutual radio communication between a radio relay device, presenting a radio link to the mobile terminal, and the mobile terminal; and a communication band notifying function for notifying the home agent of the detected communication band.

17. The non-transitory computer readable recording medium storing the mobile IP control program as claimed in claim 16, causing a computer to execute:

a communication band update notifying function for notifying the home agent of a newly detected communication band when the communication band of the mutual radio communication between the radio relay device and the mobile terminal is changed.

18. The non-transitory computer readable recording medium storing the mobile IP control program as claimed in claim 16, causing a computer to execute:

a communication band detecting function for transmitting a response request to the mobile terminal when the communication band of the mutual radio communication performed between the radio relay device and the mobile terminal is not able to be detected, and detecting a communication band based on the time period from the response request to a response.

19. The non-transitory computer readable recording medium storing the mobile IP control program as claimed in claim 16, wherein a radio base station is used for the radio relay device.

* * * * *